United States Patent [19]

Abel et al.

[11] Patent Number: 5,479,532
[45] Date of Patent: * Dec. 26, 1995

[54] APPARATUS FOR READING MAGNETIC INFORMATION FROM A DOCUMENT HAVING A READ HEAD MOUNTED ON A CIRCUIT BOARD PORTION PERMITTING RESILIENT DEFLECTION

[75] Inventors: Jay A. Abel; David B. VanHorn, both of Hartland; Jalem M. Getz, Waukesha, all of Wis.

[73] Assignee: Direct Data Systems, Hartland, Wis.

[ * ] Notice: The portion of the term of this patent subsequent to Nov. 22, 2011, has been disclaimed.

[21] Appl. No.: 40,629

[22] Filed: Mar. 31, 1993

[51] Int. Cl.⁶ .............................. G06K 7/08; G11B 15/60
[52] U.S. Cl. .......................... 382/137; 382/320; 235/449; 235/482
[58] Field of Search .................... 382/7, 64, 137, 382/135, 320; 235/449, 450, 475, 482; 192/210

[56] References Cited

U.S. PATENT DOCUMENTS

| | | | |
|---|---|---|---|
| 3,092,809 | 6/1963 | Merrit et al. | 382/7 |
| 3,391,387 | 7/1968 | Flores | 382/11 |
| 3,558,860 | 1/1971 | Bauldreay et al. | 235/476 |
| 3,571,793 | 3/1971 | Britt | 382/7 |
| 3,627,990 | 12/1971 | Sallach | 235/458 |
| 3,796,861 | 3/1974 | Hirata et al. | 235/474 |
| 3,818,446 | 6/1974 | Benson | 382/7 |
| 3,831,009 | 8/1974 | McMillin | 235/474 |
| 3,870,629 | 3/1975 | Carter et al. | 302/64 |
| 4,031,359 | 6/1977 | Christou et al. | 235/475 |
| 4,107,653 | 8/1978 | Kruklitis | 382/64 |
| 4,247,008 | 1/1981 | Dobbs | 209/569 |
| 4,300,041 | 11/1981 | Nama | 194/210 |
| 4,315,246 | 2/1982 | Milford | 235/449 |
| 4,396,902 | 8/1983 | Warthan et al. | 235/449 |
| 4,432,458 | 2/1984 | Daboub | 209/564 |
| 4,624,588 | 11/1986 | Bivin | 400/105 |
| 5,054,092 | 10/1991 | LaCaze | 382/11 |
| 5,091,961 | 2/1992 | Baus Jr. | 382/64 |
| 5,113,445 | 5/1992 | Wang | 380/51 |
| 5,157,246 | 10/1992 | Nakanishi | 235/482 |
| 5,347,593 | 9/1994 | Klinefelter | 382/7 |

OTHER PUBLICATIONS

Jansson "Handbook of Applied Mathematics" D. Van Norstrand Comp, 1933, pp. 500–501.
American National Standard Specifications For Placement And Location of MICR Printing, X9.13, Approved May 4,1990.

*Primary Examiner*—Michael T. Razavi
*Assistant Examiner*—Larry J. Prikockis
*Attorney, Agent, or Firm*—Foley & Lardner

[57] ABSTRACT

A device for reading magnetic information from documents hand-fed to the device is described herein. Such a device may be configured as a hand-fed check reader for reading MICR information from a check. The check reader includes a housing having a configuration designed to allow a human operator to efficiently hand-feed checks to the reader. In particular this configuration includes a check support surface and associated rail which assists the operator in guiding the check to a read head located adjacent to the surface. The read head is coupled to circuitry for generating signals representative of MICR information, and may be supported by a circuit board which also supports the circuitry. The reader also includes a drive mechanism having a drive wheel for forcing the check against the head while the check is driven along the head during reading. To increase the reading accuracy of the reader, a pair of magnets are supported relative to the support surface to align the dipoles of the MICR information prior to reading by the read head.

24 Claims, 15 Drawing Sheets

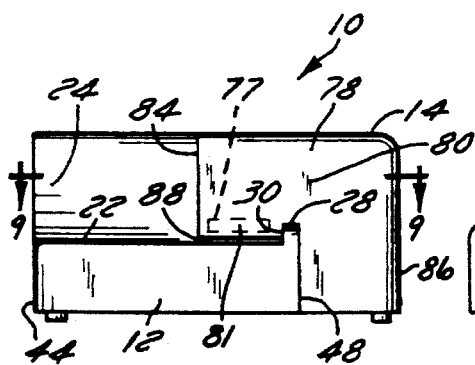
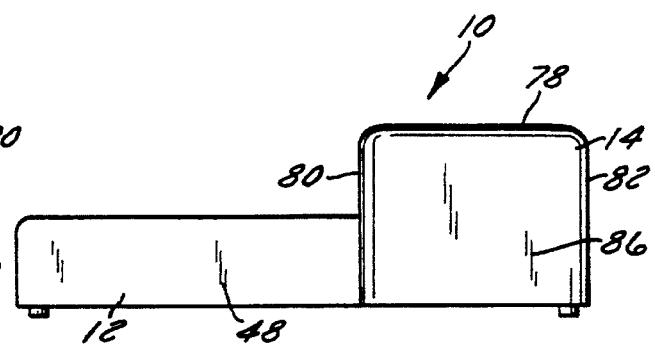
FIG. 5　　　　　FIG. 6
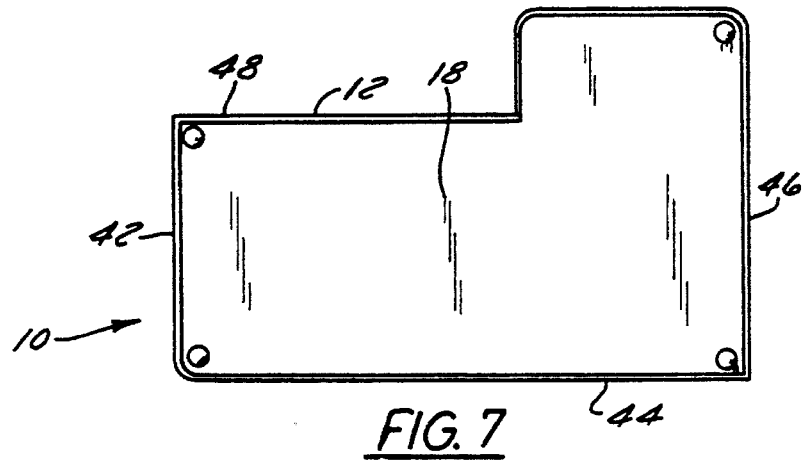
FIG. 7

APPARATUS FOR READING MAGNETIC INFORMATION FROM A DOCUMENT HAVING A READ HEAD MOUNTED ON A CIRCUIT BOARD PORTION PERMITTING RESILIENT DEFLECTION

CROSS-REFERENCE TO RELATED APPLICATIONS

The present application is related to U.S. Pat. No. 5,367,581 issued Nov. 22, 1994, by Abel et al., entitled "Apparatus For Interacting With Magnetic Information of a Document".

FIELD OF THE INVENTION

This invention relates generally to reading magnetic information from a document. More particularly, the present invention relates to a document reader for efficient reading of hand-fed documents, such as checks submitted at a point-of-sale, with increased reading accuracies from aligning the dipoles of magnetic information on the documents.

BACKGROUND OF THE INVENTION

The technology of reading information which is magnetically encoded on documents has been developed for use in a number of areas, including banking. Machines have been developed for use in the banking industry to read magnetically encoded information from checks, such as the bank from which the check was drawn and the account number ("ON US" field). These machines are designed for high speed check reading (e.g. 5000 to 10,000 checks per hour) with very high reading accuracies. However, these machines are relatively large and very expensive. Accordingly, their size and cost limit their range of application. For example, there is presently a need and desire at point-of-sale (POS) locations in retail stores to read magnetically encoded information from checks without having to key the information into a data entry terminal.

The need for a POS check reader is only partly fulfilled. For example, Fargo Electronics makes such a drive, sold under the name the "Checkreader". Another example is the Onyx check reader produced by VeriFone. Devices of this type are typically sized and priced appropriately for use at POSs. However, many check readers which are usable for check reading at POSs suffer a number of problems, including check reading inaccuracy, difficult or awkward hand presentation of a check to the reader, and electromagnetic sensitivity. Additionally, these readers are only designed to read one type of magnetically encoded character type.

Check reading inaccuracy can be caused by magnetic interference, and results either in a misread check or an error signal. The problem of electromagnetic sensitivity is usually caused by the requirement that a check reader be located close to a cash register, scale or UPC scanner. This sensitivity results in reduced reading accuracy or inoperability.

Referring to the inability of typical POS check readers to read different types of magnetically encoded characters, this problem is usually the result of signal filtering techniques used when reading magnetically encoded characters. For example, a check reader configured to read E-13B character types (used as a standard in the U.S. and parts of Europe) will typically be unable to read CMC-7 character types (used as a standard in France and parts of South America).

Another cause of reading inaccuracy is the manner in which the magnetically encoded information is applied or incorporated into the document (check). In particular, magnetically encoded information can be applied to documents with relatively inexpensive desktop printers. These devices can apply magnetic material (toner) in such a way that the resulting magnetic configuration will be anisotropic normal to the plane of the document. This type of configuration is problematic in that it can not be properly read if not correctly magnetized.

The configuration of E-13B character type and poor ergonomic design can result in difficult and awkward hand presentation of checks to POS check readers. More specifically, E-13B style was designed to be read from the right to left. Accordingly, the read head of a check reader in relation to the feed arrangement should be positioned so that the person feeding the check to the reader is capable of accomplishing this task with a natural motion and the least amount of manipulation of the check, regardless of whether the person is right or left-handed. The ability of a person to efficiently present checks to the check reader is important in most POS situations due to the relatively high volume of customer service required.

Accordingly, it would be advantageous to provide a POS-type check or document reader with improved accuracy, the ability to read more than one character type, and have a configuration designed to improve the ease at which a check can be presented to the reader. Additionally, these improvements should be provided without substantially increasing the cost of the check reader.

SUMMARY OF THE INVENTION

The present invention provides a device for reading magnetically encoded information from documents which are hand-fed to the device. By way of example, such a device may be a check reader for reading MICR information from a check which is manually fed to the reader by a human operator. The device includes a housing having a planar surface disposed relative to a magnetic read head which is supported by the housing. A document guide rail may be provided along the support surface to assist the operator in directing a document along the support surface in a direction parallel to the rail and toward the read head. The magnetic read head includes a read surface at which magnetically encoded information is read, and the head is supported so that the read surface is located in substantially the same plane as the planar surface. To align the dipoles of the magnetically encoded information before it is passed by the read head, first and second magnets supported by the housing are situated relative to the planar surface. The housing is configured such that planar surface is exposed to permit a human hand to force a document onto the planar surface and against the guide rail, and move the document along the surface, the guide rail and from the first and second magnets toward the read head.

In one embodiment of the invention, the magnets may be oriented on opposite sides of the planar surface, and in another, they may be oriented on the same side of the surface. As discussed below, the orientation may depend upon the application for the document reader. Another embodiment of the invention contemplates using permanent magnets or electromagnets, where certain applications may dictate the use of a combination of the two magnet types.

BRIEF DESCRIPTION OF THE DRAWINGS

The invention will hereinafter be described with reference to the accompanying drawings, wherein like reference numerals denote like elements, and:

FIG. 5 is a end elevation view illustrating the check reader;

FIG. 6 is a side elevation view, similar to FIG. 2, illustrating the opposite side of the check reader;

FIG. 7 is a bottom plan illustrating the check reader;

DETAILED DESCRIPTION OF THE PREFERRED EMBODIMENT

Figure 1:
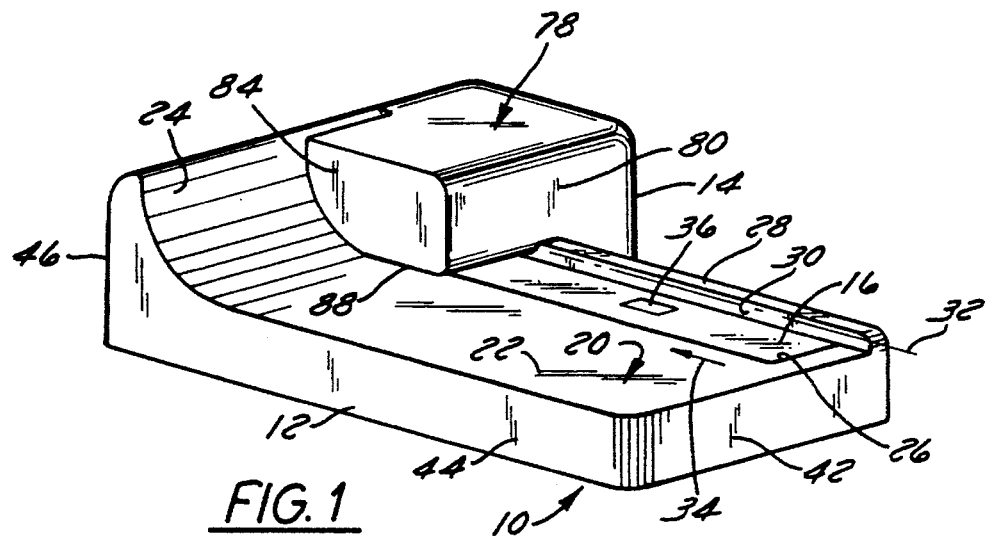
FIG. 1 is a perspective view illustrating a check reader.
Figure 4:
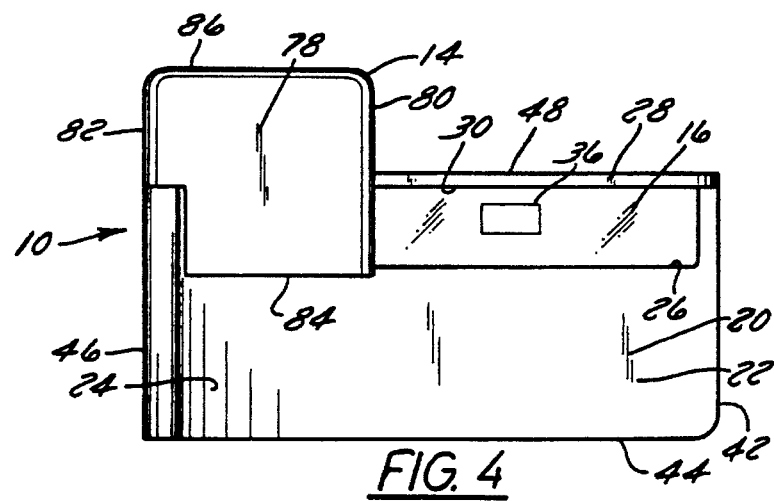
FIG. 4 is a top plan view illustrating the check reader.
Figures 2, 3:
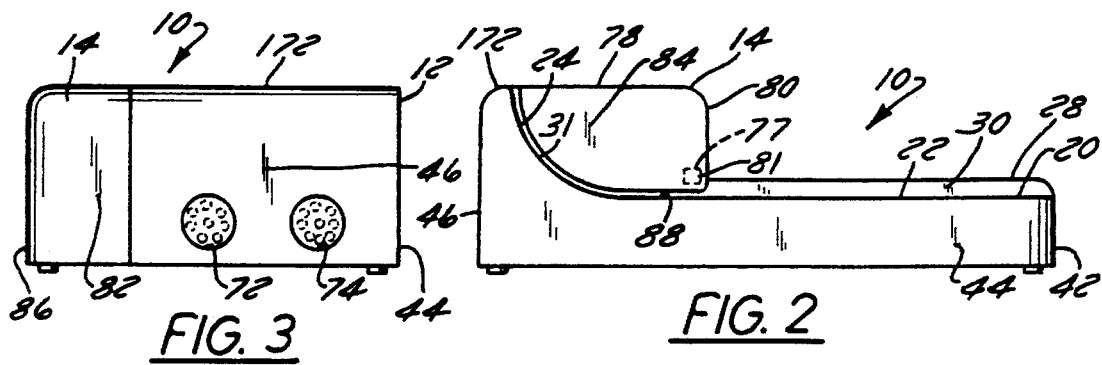
FIG. 2 is a side elevation view illustrating the check reader.
FIG. 3 is a end elevation view illustrating the check reader.

Referring to FIGS. 1–8, the housing of a check reader 10 generally includes a housing base 12, components cover 14, a display and sensor window 16, and a bottom cover plate 18.

Figure 14:
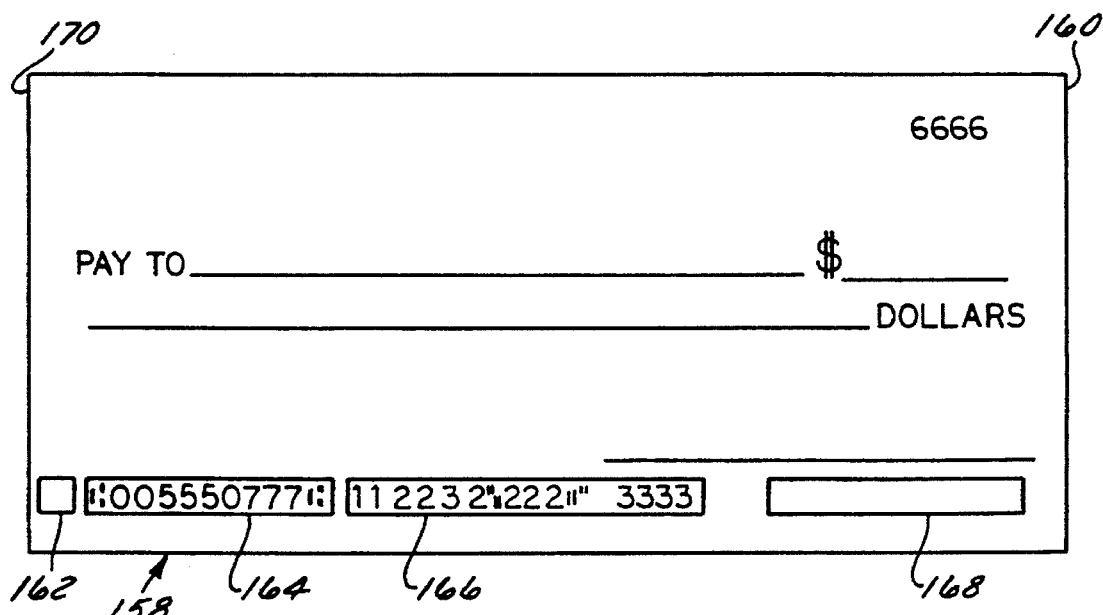
FIG. 14 is a representation of a check to be read.

Housing base 12 includes a check support surface 20 having a flat portion 22 extending into a curved surface 24. Surface 24 includes a substantially rectangular depression 26 designed to include display and sensor window 16. Surface 22 and the top surface of window 16 lie in substantially the same plane to provide a planar surface for slidably supporting a document such as a check 158 (FIG. 14). Depression 26 is adjacent to a document guide rail 28.

In the present embodiment, rail 28 is molded integrally with base 12, has a substantially rectangular cross-section, and extends upwardly from the planar surface formed by the top surface of window 16 and surface 22. Rail 28 is generally straight along surface 22, and is configured to follow surface 24. This configuration of rail 28 provides a surface 30 which is substantially perpendicular to the plane within which surface 22 and the surface of window 16 lie, and a surface 31 which is substantially perpendicular to surface 24. Rail 28 includes a longitudinal axis 32 which is parallel to surface 22, and parallel to the direction of travel of a check which is slid along the surface 22 and the surface of window 16, as generally indicated by arrow 34.

Figure 10:
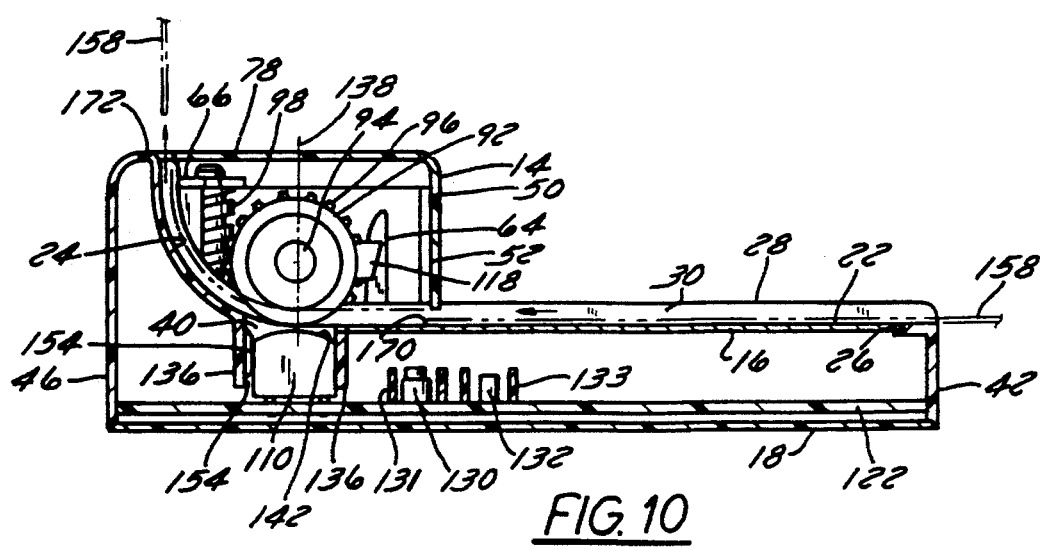
FIG. 10 is a sectional view taken along line 10—10 FIG. 9.

Housing base 12 also includes a display port 36, a sensor port 38 and a magnet support pocket 76. Both of these ports are formed within rectangular depression 26 and are covered by window 16, where pocket 76 is molded into depression 26 between rail 28 and port 38. Display or sensor devices are disposed within ports 36 and 38. At the interface between flat surface 22 and curved surface 24, a read head opening (port) 40, which may be rectangular, is located adjacent to guide rail 28. Extending downwardly from surfaces 22 and 24 are side walls 42, 44, 46 and 48. Side walls 42, 44, 46 and 48 are generally perpendicular to surface 22 and include formations such as screw pedestals (not shown) which allow bottom cover plate 18 to be fastened to the bottom of base 12, as generally shown in FIG. 10. Side wall 46 also includes two openings 72 and 74 configured to provide access to multi-pin connectors (see FIG. 3).

Figure 9:
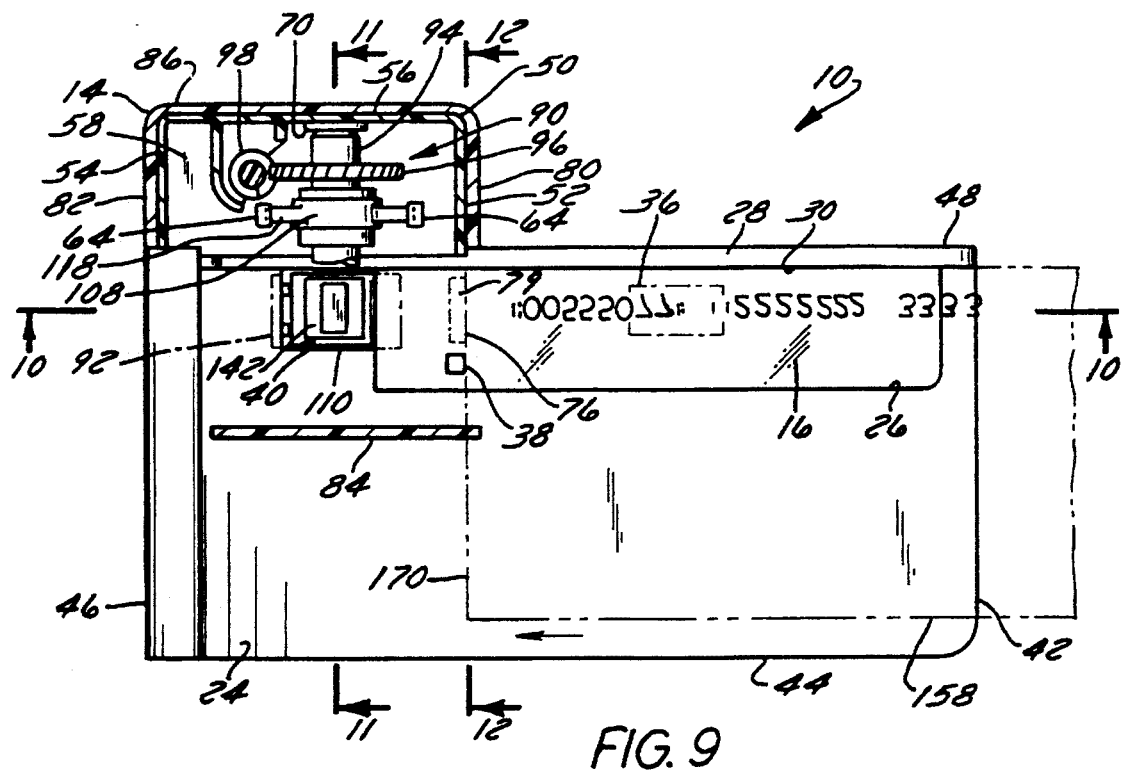
FIG. 9 is a sectional view taken along line 9—9 in FIG. 5.

Housing base 12 also includes a document drive mechanism support 50 which extends outwardly from side wall 48. Support 50 includes a pair of side support walls 52 and 54 extending perpendicular to, and outwardly from, side wall 48. Walls 52 and 54 terminate at a support wall 56 which is substantially parallel to side wall 48 (see FIG. 9). A motor and bearing support platform 58 extends between walls 52, 54 and 56 and lies below flat surface 22. Platform 58 lies in a plane substantially parallel to the plane within which surface 22 lies.

Figure 8:
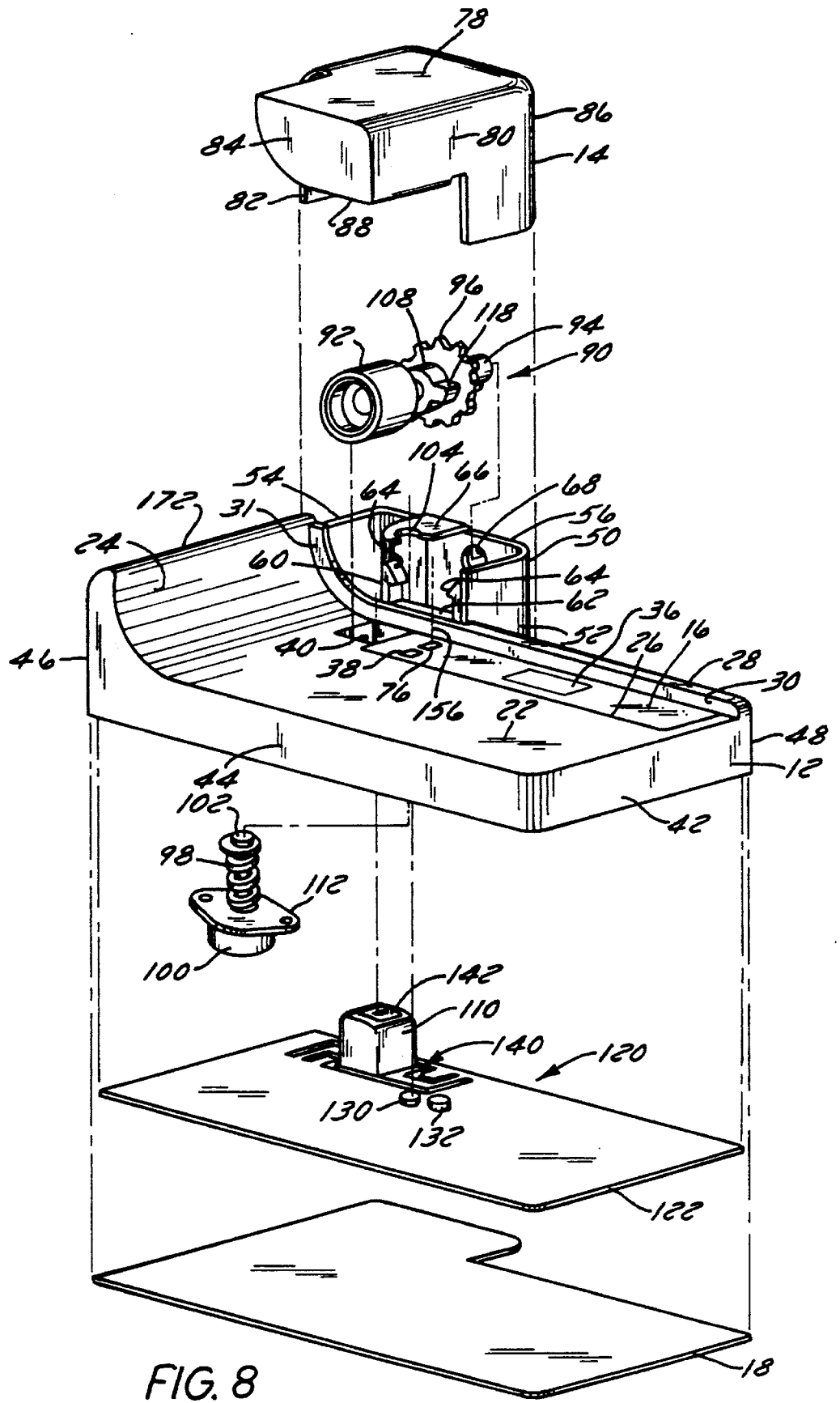
FIG. 8 is an exploded perspective view illustrating the check reader read head, document mechanism drive, and printed circuit board and housing.
Figure 11:
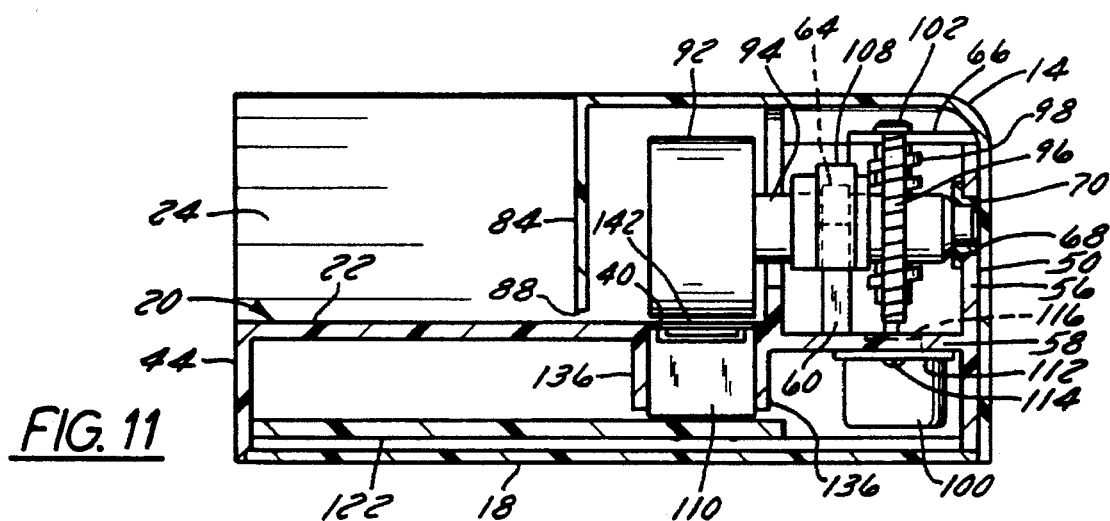
FIG. 11 is a sectional view taken along line 11—11 FIG. 9.
Figure 12:
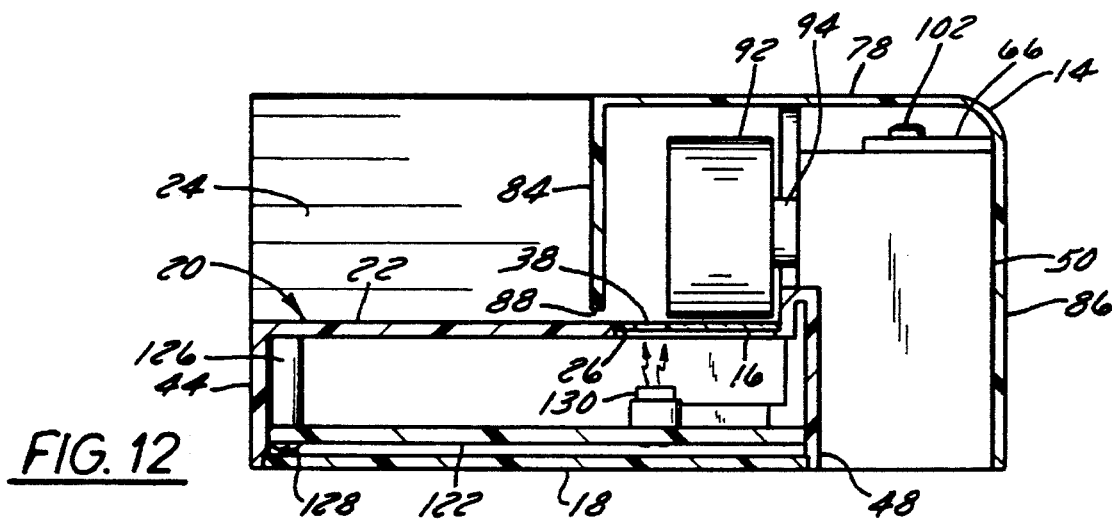
FIG. 12 is a sectional view taken along line 12—12 FIG. 9.

A first bearing support 60 extends upwardly from the motor and bearing support platform 58 (see FIG. 11). As best shown in FIG. 8, support 60 includes a pedestal 62 and a pair of flexible bearing grips 64 for engaging a bearing, as discussed below. A worm gear bearing support 66 extends upwardly from platform 58 and from the top of wall 56. An opening 68 in side wall 56 supports a shaft bearing 70, as discussed further below.

By way of example, housing base 12 may be molded from a thermoplastic material, such as ABS, T-grade, using an injection molding process. By way of further example, display and sensor window 16 may be fabricated from a substantially clear plastic material, where a coloring agent is printed on the lower surface of the material to make its surface color appear substantially the same as flat surface 22. Window 16 may also be fabricated to include an adhesive lower surface. The adhesive fastens window 16 in rectangular depression 26.

Components cover 14 has a generally box-like configuration including a top wall 78 substantially parallel to surface 22, side walls 80 and 82 substantially parallel to support walls 52 and 54, and end walls 84 and 86 substantially parallel to support wall 56. Walls 78, 80, 82, 84 and 86 are integrally molded as one cover 14, where walls 80, 82 and 86 intersect wall 78 and each other at rounded corners. Wall 84 intersects walls 78 and 80 at substantially right angle corners. The sizing of cover 14 allows walls 80, 82 and 86 to contact the outer surfaces of walls 52, 56 and 54, respectively, when cover 14 is mounted on base 12. Cover 14 is held onto base 12 by cooperation of tabs and grooves in walls 52, 80, 54 and 82 (not shown).

Walls 78 and 84 extend over surfaces 22 and 24, respectively, and wall 78 supports wall 84 over surface 24 and a portion of surface 22. Surface 24 has a radius of approximately 1 inch, where wall 84 includes a lower edge 88 which is substantially parallel to surfaces 22 and 24 along the portions of these surfaces over which it extends. This configuration of walls 78, 80 and 84 prevents access to the components housed under cover 14 while also allowing the document to be passed between walls 78, 80 and 84 and surfaces 22 and 24.

Referring to FIGS. 8–12, a document drive mechanism 90 includes a document drive wheel 92, a drive wheel support shaft 94, a helical gear 96, a worm drive gear 98, and a two pole stepping motor 100. In the presently preferred embodiment, wheel 92, shaft 94 and gear 96 are molded as a single piece component, with the peripheral surface of wheel 92 being molded from a material different from the material making up the hub of wheel 92, shaft 94 and gear 96. More specifically, the peripheral surface of wheel 92 is fabricated from a material having properties sufficient for providing adequate frictional engagement between wheel 92 and the surface of a document. By way of example, the surface of wheel 92 may be fabricated from a material such as polyurethane, neoprene or rubber, and the hub of wheel 92, shaft 94 and gear 96 may be fabricated from a material such as acetal.

Worm drive gear 98 is fastened directly to the shaft of motor 100 and is rotatably supported within document drive mechanism support 50. The axis of gear 98 is perpendicular to the axis of support shaft 94. In particular, worm drive gear 96 is rotatably supported by the bearings of motor 100 and a cap bearing 102 supported by worm gear bearing support 66. Bearing 102 rotatably supports gear 96 at its top end, and is snap fit into a bearing retention slot 104 in support 66. Motor 100 is fastened to the bottom of motor and bearing support platform 58 at its flange 112 by a pair of screws 114 which are self-threaded into platform 58.

Document drive wheel 92 and worm gear 96 are both rotatably supported with shaft 94 relative to worm drive gear 98 and surface 22 by cap bearing 70 and a half journal bearing 108. Cap bearing 70 is supported within opening 68 and rotatably supports the corresponding end of shaft 94. Journal bearing 108 is a half journal bearing in that it only provides a bearing surface over the top surface of shaft 96. Bearing 108 rotatably engages shaft 94 between wheel 92 and gear 96. Shaft 94 is held into rotational engagement with bearing 98 by the resultant upward force caused by the interaction of worm gear 98 and drive gear 96, and the upward force applied to drive wheel 92 by a magnetic transducer 110 (discussed below).

In general, the components of document drive mechanism 90 are configured to reduce the number of components in reader 10. This configuration also reduces the number of steps required to assemble drive mechanism 90 within document drive mechanism support 50. More specifically, referring to FIG. 8, mechanism 90 is assembled into support 50 as follows:

1. Worm drive gear 98, motor 100 and cap bearing 102 are located relative to platform 58 by passing gear 98 and 102 through an opening 116 in platform 58;
2. Bearing 102 is engaged with retention slot 104, and motor 100 is fastened to the bottom of platform 58 by screws 114;
3. Support shaft 94, cap bearing 70, gear 96 and wheel 92 are located relative to the platform 58, and cap bearing 70 is engaged with the free end of shaft 94 and is engaged with opening 68 in wall 56; and
4. Half journal bearing 108 is placed over shaft 94 between gear 96 and wheel 92, and forced downward until flexible bearing grips 64 engage a pair of bearing shoulders 118 to hold bearing 108 between pedestal 62 and grips 64.

To provide positional stability for journal bearing 108, a pair of pins (not shown) may be provided in the top surface of pedestal 62, where the bottoms of shoulders 118 include mating opening holes (not shown).

By way of example, bearings 70, 102 and 108 may be fabricated using a molding process and a material such as polyester. Additionally, the gear ratio provided by the combination of drive gear 96 and worm gear 98 may be in the range of 12-to-1. However, while the gear arrangement shown provides an adequate gear reduction in a relatively small space, it may be preferable to use other drive arrangements (e.g. direct drive, spur gear drive, chain drive, belt drive), depending upon the application, as this configuration is only about 55% efficient.

Referring to FIGS. 8–13, a circuit board structure 120 includes circuitry having various discrete components and connections as described in detail below in reference to FIGS. 15–21. The mechanical support for the circuitry and components thereof is a planar circuit board 122 of the type manufactured from a material such as FR-4. (For purposes of clarity, only some of the components are shown on board 122 in FIG. 13.) The circuit connections of circuit board 122 may reside in one or more planes within the circuit board to connect the components of the circuitry. Structure 120 may be fastened within housing base 12 to three screw pedestals 126 by three self-threading screws 128 extending through openings 124 in board 122. Structure 120 is fastened within base 12 such that circuit board 120 lies in a plane which is generally parallel to planar surface 22 (see FIGS. 10–12).

In addition to supporting the components of the circuitry for check reader 10, circuit board 22 supports magnetic transducer 110, an LED 130, a photo transistor 132, and an LED display 134. When transducer 110 is mounted upon circuit board 122, transducer 110 extends through transducer head opening 40. More specifically, opening 40 is configured to include four side walls 136 extending downwardly from surfaces 22 and 24 such that they form a rectangular channel having a central axis 138 which is perpendicular to, and intersects, the longitudinal axis of drive wheel support shaft 94.

LED 130 and photo transistor 132 are mounted upon circuit board 22 relative to sensor port 38 such that the edge of a document passing over port 38 can be sensed. The edge is sensed as the result of the application of light through port 38 by LED 130 and the response of photo transistor 132 to a change in the reflected light as a result of the passage of an edge of the document past port 38. LED display 134 is mounted to circuit board 122, and the information on display 132 may be read through port 38.

Referring back to FIG. 10, LED 130 and transistor 132 are surrounded by cylindrical walls 131 and 133, respectively. Walls 131 and 133 increase the accuracy with which transistor 132 senses the passage of an edge, by reducing the amount of light which LED 130 directly applies to transistor 132. Depending upon the characteristics of LED 130 and transistor 132, the orientation and lens configurations could be varied to improve the accuracy and reliability of edge sensing for a particular application.

Referring again to magnetic transducer 110, this transducer is suspended relative to circuit board 122, and allowed to move relative to circuit board 122 (e.g., vertically along an axis substantially perpendicular to the surface of board 122), by being mounted upon a spring member 140 fabricated from the material of circuit board 122. Spring member 140 permits head 110 to be elastically deflected relative to circuit board 122. When circuit board structure 120 is mounted within base 12, a top surface 142 of transducer 110 is biased with a predetermined force (e.g., 4–16 ounces) against the bottom of document drive wheel 92. Accordingly, when a document is fed into check reader 10, it is forced against drive wheel 92 by top surface 142 to provide an appropriate force normal to the surface of wheel 92 to permit wheel 92 to drive the document along transducer 110. In other words, head 110 is resiliently mounted with respect to board 122.

Figure 13:
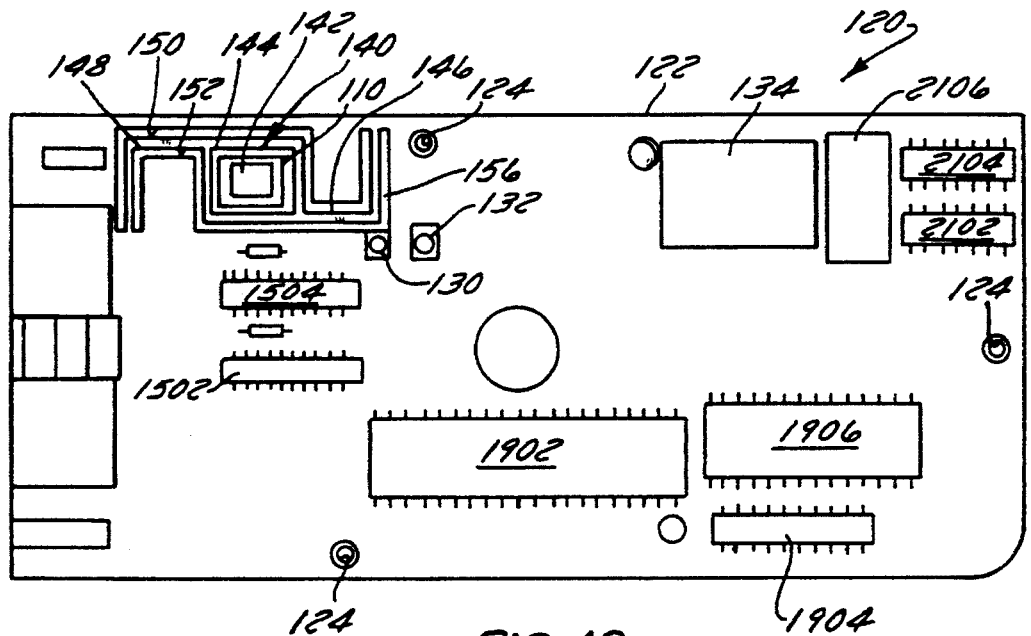
FIG. 13 is a top plan view of the printed circuit board shown in FIG. 8.

As will be recognized, the configuration of spring member 140 could take a number of forms, such as the one of the present embodiment, which includes a substantially rectangular head support portion 144, a first L-shaped leg 146, and a second L-shaped leg 148. As shown in FIG. 13, spring member 140 is bounded by first and second grooves 150 and 152, which may be appropriately machined or cut into circuit board 122. A spring member 140 fabricated from the material of, and integrally with, circuit board 122, provides a way to spring mount transducer head 110 relative to base 12 and wheel 92 without the need for additional springs and various other support structures which are costly in that they must be manufactured and assembled into check reader 10. It has been found that the fabrication of a spring such as member 140 from the circuit board material provides a spring which has properties which are as, or more, satisfactory than a conventional metal based spring.

The provision of a spring member 140 fabricated from the material of circuit board 122 allows the electrical connections from transducer 112 to the circuitry of circuit board 120 to pass along L-shaped legs 146 and 148. This eliminates the need for separate leads between transducer 120 and the circuitry of board 120 to which the signals from transducer 110 are applied. However, there may be applications where, for various reasons, it may be desirable to couple transducer 110 with the associated circuitry by leads which are not fabricated upon circuit board 122.

Certain problems may be encountered in the operation of check reader 10. Non-circular and non-concentric wheels 92 is one of these problems. One of the problems caused by non-circular and non-concentric wheels 92 is that transducer 110 may bounce against the document being moved by wheel 92. To dampen this bouncing, a dampening material such as a felt or rubber tab 154, or other suitable material may be fastened (e.g. glued) within panel 136.

In reference to magnet support pocket 76 located in depression 26, an associated support pocket 77 is located within components cover 14 at the bottom of wall 80, directly over support pocket 76. Magnet support pockets 76 and 77 both include magnets 79, 81 for appropriately aligning the dipoles of magnetic information included on or in the document passed through reader 12. Magnets 79, 81 may be permanent magnets or electromagnets, and have their poles aligned along an axis 156 which is substantially perpendicular to surface 22. This arrangement of magnets 79, 81 orients the magnetic dipoles of magnetic information (characters) on the document in one direction to provide a condition such as saturation. The location of magnet support pockets 76 and 77 provides magnets 79, 81 on opposite sides of the document transport path 34 along the surface 22. The magnets should be configured to provide a magnetizing force which is greater than the coercive force of the magnetic dipoles on the documents, and the magnetic poles of the magnets should be facing each other. Thus, for example, both south poles could be located adjacent to each other or both north poles could be located adjacent to each other. Further information relating to the configuration of the magnets and optimization of their location may be found in U.S. Pat. No. 4,107,653, issued on Aug. 15, 1978 to Karlis Kruklitis.

For certain applications it may be useful to use electromagnets activated by direct current for magnets 79, 81. Magnets 79, 81 could then be selectively energized to leave the magnet off when not needed, or selectively polarized as required. In another alternative, magnet 81 could be eliminated. This arrangement would align the dipoles of magnetic information on the document as the information passed over one pole of the magnet. As still another alternative, it may be desirable to use a combination of a permanent magnet and an electromagnet.

The details of the operation of the components and circuitry of circuit board structure 120 will be discussed below; however, the overall operation of check reader 10 will be discussed now in reference to check 158 illustrated in FIG. 14. Before discussing the operation of check reader 12, the configuration of check 158 will be described.

The location of information on checks is generally specified in the American National Standard Bank Check Specifications for Magnetic Ink Character Recognition (MICR). Under these specifications, the right edge of a check, when its face is viewed, is used as a reference edge referred to as 160. The specification provides for a MICR character set referred to as E-13B characters used in printing or encoding information on documents which enables them to be processed by standard sorting machines. Standard fields on check 158 are the EPC field 162, the routing field 164, the "ON US" field 166, and the amount field 168. The information in these fields is printed in magnetic ink. A typical personal check is 6 inches long and about 2½ inches wide. The center of the EPC field 162 is 5.75 inches from the right edge, the right edge of routing field 164 is 4.250 inches from the right edge, the right edge of "ON US" field 166 is 1.875 inches from the right edge 160, and the right edge of amount field 168 is 0.3125±0.0625 inches from right edge 160.

In light of the location and orientation of the MICR information on check 158, the configuration of check reader 10 is important from an ergonomic standpoint in that it must be set up to permit the user to easily direct a check into reader 10. More specifically, in addition to scanning the information in fields 162, 164, 166 and 168, this information may be entered manually via a 10-key numerical keypad. Accordingly, if the configuration of a check reader makes it difficult to easily and quickly direct a check therethrough, a skilled keypad operator may be able to input the information faster by using a keypad than by using the check reader. Since the overall purpose of a check reader is to increase the speed of data entry, the structural design of the check reader is important.

The structural design of check reader 10 which, while having many features which are ornamental, has certain features which allow a check to be efficiently directed through reader 10. More specifically, the location of rail 28 relative to surfaces 22 and 24, the location of head 110, and location of document drive mechanism 90 permit efficient face-down feeding of checks by either a left or right-handed person when handed a check face up for viewing. For personal checks which are 6 inches long and approximately 2½ inches wide, flat surface 22 is preferably about 3 inches wide and 5 inches long, where 4 inches of surface 22 is provided in front of side wall 80. By providing this surface size along with document guide rail 28, the user can efficiently take check 158, press it face down against rail 28 on surface 22, and direct the check toward magnetic transducer 110 and document drive wheel 92.

In operation, when a document such as check 158 is inserted into check reader 10, with the fields positioned face down and adjacent to guide rail 28, the left edge 170 of check 158 is sensed by photo transistor 132 which causes the control circuit (discussed below) of check reader 10 to run motor 100. Motor 100 and gears 96, 98 cause document drive wheel 92 to rotate in a clockwise direction and pull check 158 along surfaces 22 and 24. When check 158 moves along surfaces 22 and 24, the MICR information in fields 162, 164, 166 and 168 pass over magnetic transducer 110. As the MICR information passes over magnetic transducer 110, this information is sequentially stored by the control circuit. When photo transistor 132 provides a second signal to the control circuit which is representative of the passing of edge 160, the control circuit runs motor 100 for a predetermined number of revolutions or portions of revolutions required to drive the check from engagement between wheel 92 and transducer 110. This allows the user to remove the check from the top edge 172 of surface 24 without tearing off a corner of the check, which may be caught between wheel 92 and transducer 110.

The control circuit of check reader 10 will now be described in references to FIGS. 15–21. The components of check reader 10 with the exception of motor 100 and document drive mechanism 90 are mounted upon PC board 122. As discussed above, this configuration greatly reduces the number of structural members within reader 10 by using PC board 122 not only as a circuit board, but also as a structural member. As can readily be appreciated, this use of PC board 122 substantially reduces material and assembly costs.

Figure 15:
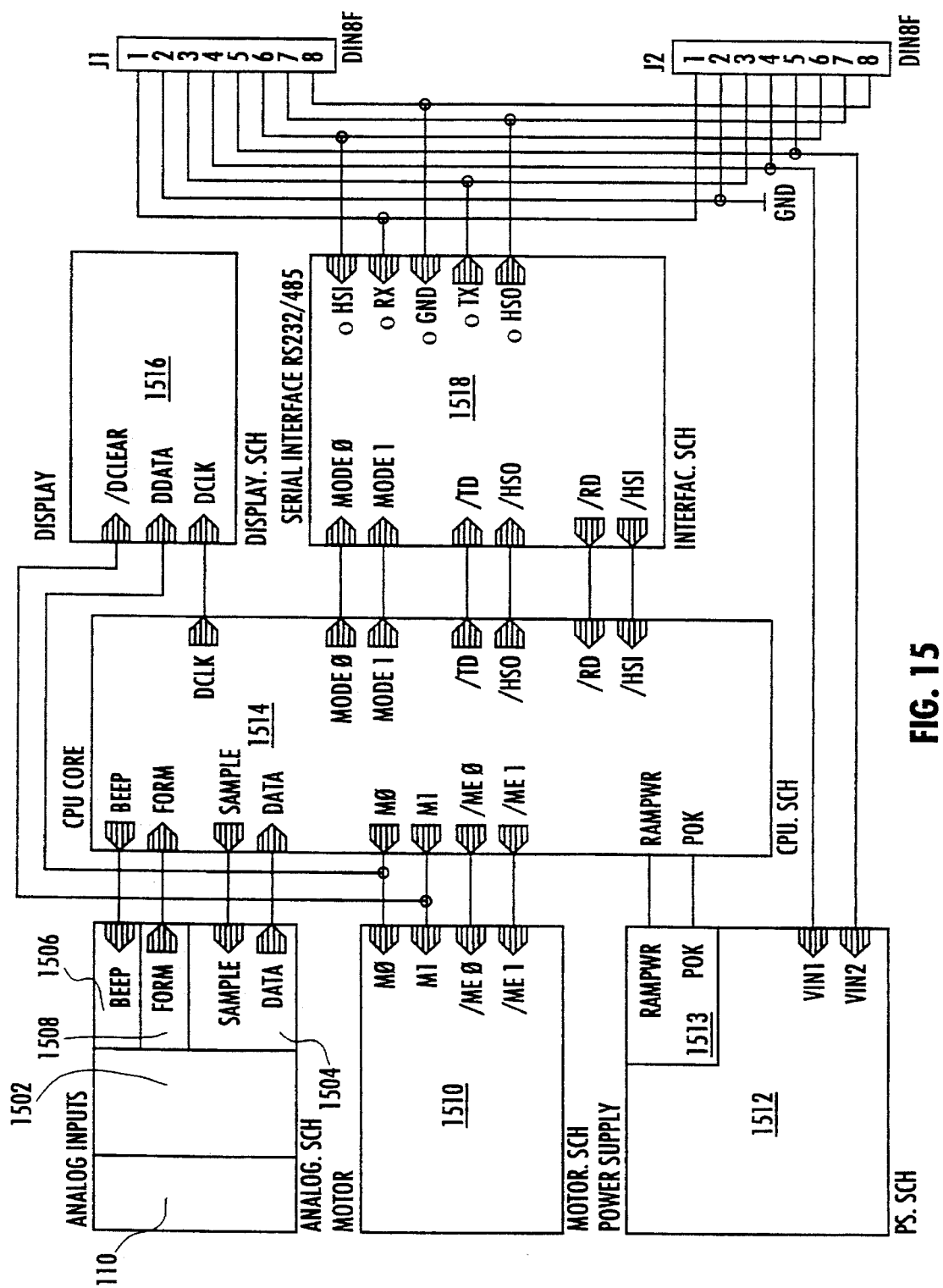
FIG. 15 is a block diagram of the check reader circuitry.

Referring to FIG. 15, the circuitry of check reader 10 generally includes a magnetic transducer 110, an amplifier and prefilter circuit 1502, an analog-to-digital converter (A/D) 1504, an audible transducer circuit 1506, a form sensor circuit 1508, a motor drive circuit 1510, a power supply 1512, a battery backup circuit 1513, a processor circuit 1514, a display circuit 1516, and an interface selection circuit 1518. In general, the circuitry allows the check reader to read magnetically encoded information (MICR characters) from a document (check 158), convert the information into an electrical signal, display check reader status information, display information from another device coupled to the check reader, display information from check 158, selectively interface with other devices using various hardware interface, controllably drive motor 100, and provide power to check reader 10. More specifically, a microprocessor 1902 of circuit 1514 (FIG. 17) applies signals to the circuitry of the check reader as shown in the following table A.

TABLE A

| SIGNAL | PORT, LINE | DESCRIPTION |
|--------|-----------|-------------|
| Beep | 3, 5 | A pulse train applied by processor 1702 to resistor 1680 of circuit 1506. |
| Form | 3, 2 | A pulse applied from invertor 1690 of circuit 1508 to processor 1702. |
| Sample | 3, 6 | A clock signal applied by processor 1702 to invertor 1664 of A/D 1504. |
| Data | 3, 1 | A pulse of varying duration |

TABLE A-continued

| SIGNAL | PORT, LINE | DESCRIPTION |
|--------|-----------|-------------|
| | | applied from terminal 1642 of A/D 1504 to processor 1702. |
| M0 | 2, 0 | Motor phase 0 and display data. |
| M1 | 2, 1 | Motor phase 1 and display clear data. |
| /ME0 | 2, 2 | Motor drive signals applied to control chip 1702. |
| /ME1 | 2, 3 | Motor drive signal applied to control chip 1704. |
| /DCLK | 2, 4 | Data signals applied to display latches 2102 and 2104. |
| MODE0 | 2, 5 | Interface signals applied to logic circuit 2022. |
| MODE1 | 2, 6 | Interface signals applied to logic circuit 2022. |
| /RD | 3, 0 | Data received from demultiplexer 2016. |
| /HSI | 3, 4 | Hand-shake data received from demultiplexer 2020. |
| /HSO | 3, 5 | Hand-shake data applied to demultiplexer 2020. |
| /TD | 3, 7 | Data transmitted from demultiplexer 2016. |

Figure 16A:
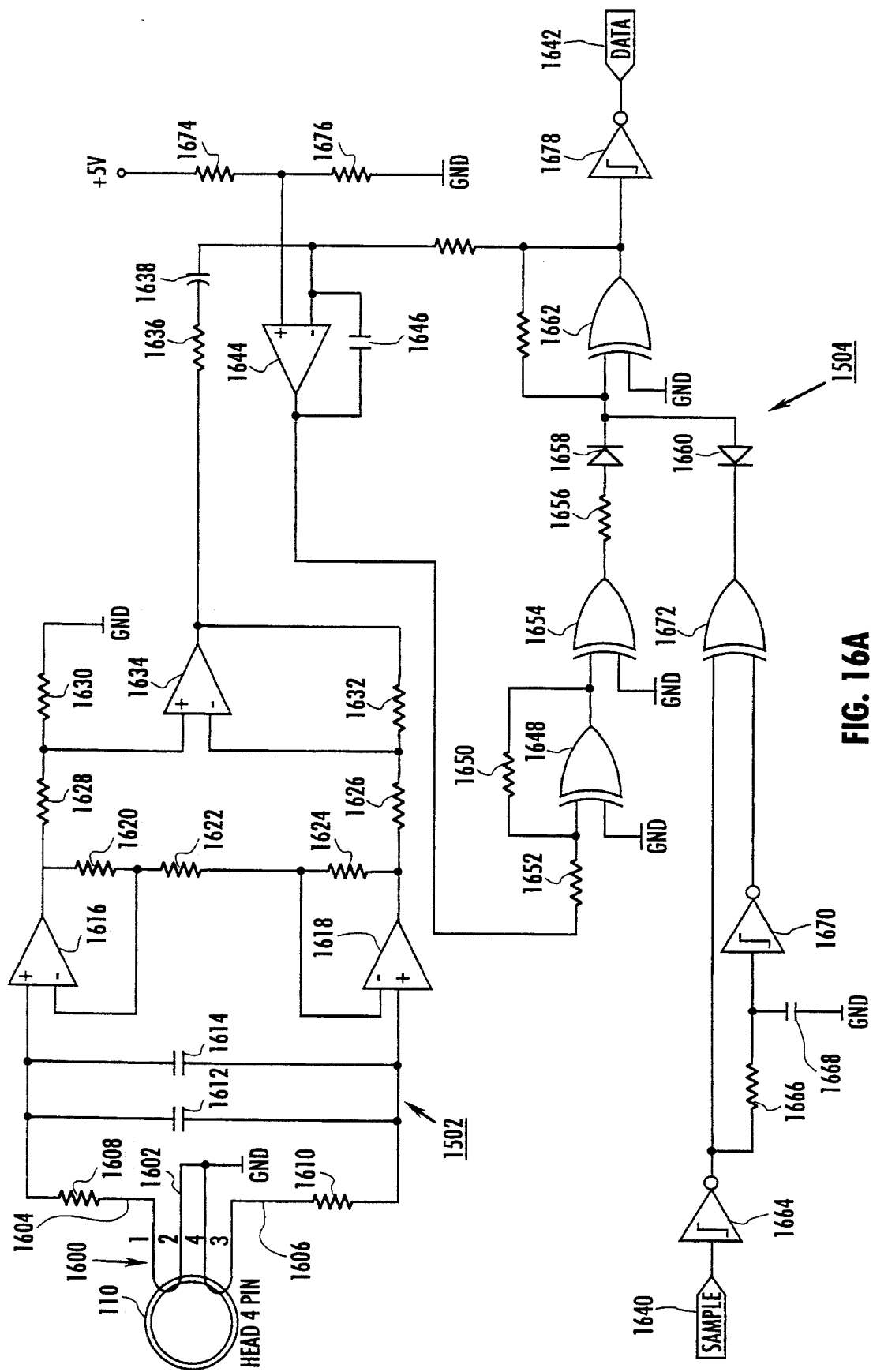
FIG. 16A is a schematic diagram for a read head amplifier and an analog-to-digital converter used in a check reader of the present invention.
Figure 16C:
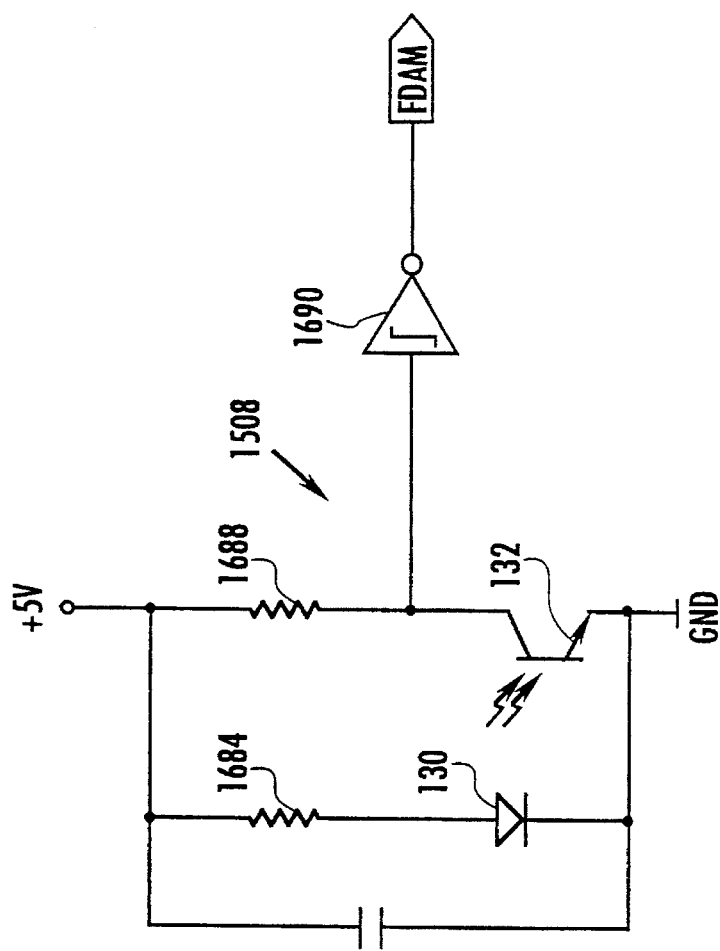
FIG. 16C is a circuit diagram for a form sensor circuit.
Figure 16B:
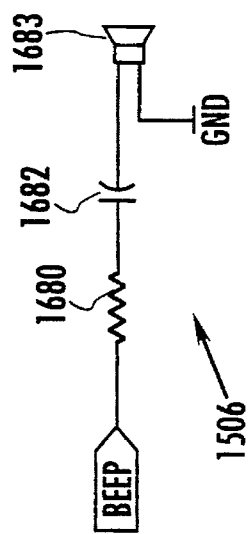
FIG. 16B is a schematic diagram for an audible transducer circuit.

Referring to FIG. 16A, magnetic transducer 110 is coupled to amplifier and prefilter circuit 1502. Transducer 110 may be a read or write head, and in the present embodiment, transducer 110 is a magnetic read head. Transducer 110 includes a balanced winding 1600 which is connected in a series aiding configuration with a center tap 1602 grounded to produce a balanced output. The voltage produced (electrical signal) is a substantially linear function of the change in density of magnetic material passing across transducer 110. Thus, a unique electrical signal is generated for different characters passing over top surface 142 of transducer 110. This electrical signal is applied, via leads 1604 and 1606, to resistors 1608 and 1610 having capacitors 1612 and 1614 connected therebetween. This arrangement provides for a 2-pole, Butterworth, low-pass filter having a cut off frequency of about 768 Hz. By way of example only, transducer 110 may be of the type manufactured by Mag-Head Engr. Corp.

The terminals of capacitors 1612 and 1614 are connected to the non-inverting inputs of a pair of operational amplifiers 1616 and 1618. Amplifiers 1616 and 1618 include feedback resistors 1620, 1622, and 1624 which provide a differential gain of approximately 600-to-1. The output of amplifiers 1616 and 1618 are coupled to the illustrated arrangement of resistors 1626, 1628, 1630 and 1632, and amplifier 1634. This arrangement provides for a unity gain differential amplifier to convert the differential output of amplifiers 1616 and 1618 to a single ended output.

The output of amplifier 1634 is applied to A/D 1504 by an RC network including a resistor 1636 and capacitor 1638 which form a high pass filter having a cut-off frequency of about 2.8 Hz. Microprocessor 1902 (FIG. 19) applies a sample clock signal to a sample terminal 1640 of A/D 1504. In response to the sample clock signal, A/D 1504 outputs a pulse at data terminal 1642 with a time duration in one state which is proportional to the amplitude of the output signal from amplifier 1634. Accordingly, the time duration is a linear representation of the density of the magnetic material passing across transducer 110 for a given sample (i.e. a series of durations is representative of a particular character). The pulse is applied to and is measured by a timer (e.g.

1.84 MHz time base) of microprocessor 1902. By way of example, microprocessor 1902 applies a sample clock signal to terminal 1640 at a rate of 7.68 KHz.

Referring more specifically to A/D 1504, this circuit includes an operational amplifier 1644 and capacitor 1646 which are coupled as shown to form a differencing integrator. A/D 1504 also includes a comparator circuit with hysteresis including an XOR gate 1648, and resistors 1650 and 1652 coupled as shown. This comparator circuit has 50 mv hysteresis and a threshold of approximately half the supply voltage (e.g. 2.5 v). The output of XOR gate 1648 is coupled to an XOR gate 1654. A flip-flop circuit is included in A/D 1504 which includes a resistor 1656, diodes 1658, 1660, and XOR gate 1662. Resistor 1656 is coupled between the output of gate 1654 and the anode of diode 1658, and the cathode of diode 1658 and the anode of diode 1660 are coupled to the inputs of gate 1662. A triggering circuit includes an invertor 1664, a resistor 1666, a capacitor 1668, an invertor 1670, and an XOR gate 1672, where the output of invertor 1664 is coupled to the input of invertor 1670 by resistor 1666 and ground by capacitor 1668. The outputs of invertors 1664 and 1670 are coupled to the inputs of gate 1672.

In general, A/D 1504 operates to maintain a constant upper limit voltage on integrator 1644. Integrator 1644 adds a DC offset (produced by a set of resistors 1674 and 1676) to the input signal from amplifier 1634. The output signal is subtracted at 1642 by maintaining a substantially constant voltage on integrator 1644. A pulse train representative of the output of amplifier 1634 and the DC offset is output at terminal 1642. The DC offset was chosen at 75% of the supply voltage to provide an output range of 0–50%, centered around 25%, of the sampling period at 1640 (1/7680*.25=32.5 μs). These limitations are imposed to avoid instability which results above 50% of the sampling period.

In operation, a sample clock signal applied at terminal 1640 is modified by the triggering circuit to provide modified negative pulses of short duration, e.g. 200 ns, at the cathode of diode 1660. The negative pulses reset the flip-flop circuit which causes the output at integrator 1644 to rise. When the output at integrator 1644 reaches approximately half of the supply voltage, the comparator circuit presents a high level to the anode of diode 1658, whereupon the flip-flop circuit is set. As a result, the output of gate 1662 produces a negative pulse of nominally 25% duration. However, since the output of amplifier 1634 is continuously added to the input of integrator 1644, the output duty cycle is modified by an amount proportional to the output signal at amplifier 1634. An invertor 1678 converts the negative pulses at the output of gate 1662 to positive pulses which are applied to port 3, line 1 of microprocessor 1902.

Audible transducer circuit 1506 (see FIG. 16B) includes a resistor 1680, a capacitor 1682 and a magnetic transducer 1683 (speaker) coupled as shown to produce a sound of predetermined duration. Resistor 1680 is coupled to port 3, line 5 of microprocessor 1902; thus, a pulse-code-modulated (PCM) signal from microprocessor 1902 is filtered by circuit 1506 to produce a particular sound.

Form sensor circuit 1508 (see FIG. 16C) includes LED 130 coupled to the supply voltage by a resistor 1684, photo transistor 132 coupled to the supply voltage by a resistor 1688, and an invertor 1690 coupled between the collector of transistor 132 and port 3, line 2 of microprocessor 1902. In one embodiment, as discussed above, an axis 1681 of LED 130 is arranged perpendicular to the surface of the document being read, and is directed at a location just before read head 110. Transistor 132 includes a wide angle lens, and is arranged with its axis 1687 parallel to the axis 1681. This arrangement allows LED 130 and transistor 132 to be directly mounted on PC board 122. (See FIG. 10.) In operation, transistor 132 produces a voltage sufficient to change the state of invertor 1690 when the edge of a document passes through its view. This results in a pulse being applied to microprocessor 1902.

Figure 17:
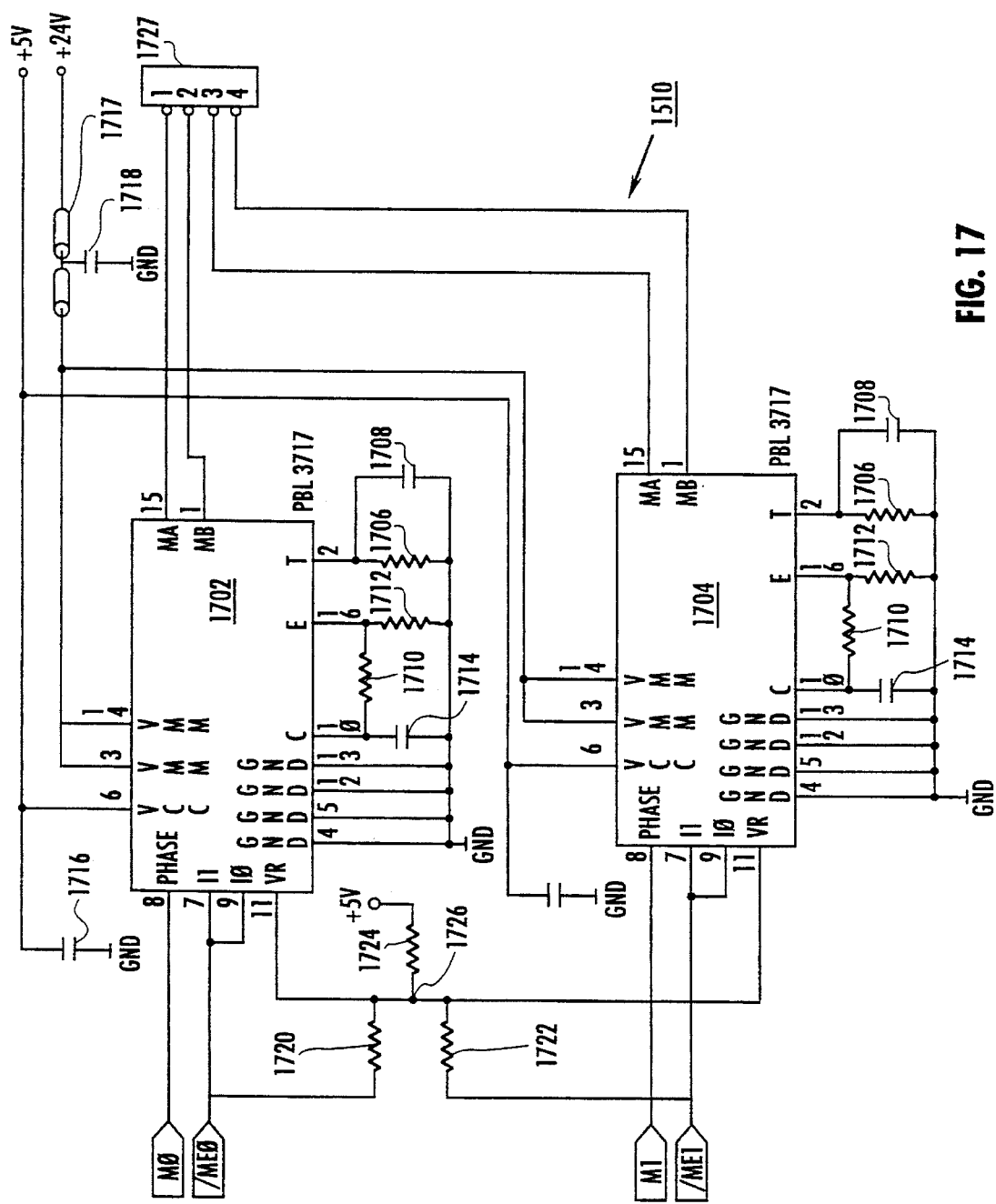
FIG. 17 is a schematic diagram for a stepping motor control.

Referring to FIG. 17, a stepping motor control circuit 1510 includes a first stepping motor winding control chip 1702, and a second stepping motor winding control chip 1704. Chips 1702 and 1704 regulate the current to each winding of stepping motor 100. By way of example, chips 1702 and 1704 may be PBL 3717 chips manufactured by Unitrode Corp., Cherry Semiconductor or Ericson Corp. Two chips 1702 and 1704 are used since the present embodiment of motor 100 is a 2-phase bipolar 7.5 degree stepping motor. Of course, the type of motor 100 and control circuit may be varied depending upon changes in motor technology and availability.

Each chip 1702 and 1704 is coupled to a dead time circuit including a resistor 1706 and capacitor 1708 coupled in parallel between the timing pin and ground. Each chip 1702 and 1704 is coupled to resistors 1710, 1712 and a capacitor 1714. Resistor 1710 is coupled between the current sense and emitter pins, resistor 1712 couples the emitter pin to ground and capacitor 1714 couples the collector pin to ground. This arrangement provides low pass filter to remove switching transients, and allows a current proportional to the winding current to feed back to the current sense pin. The ground pins of each chip 1702 and 1704 are grounded, and the VCC pins are coupled to a 5 volt supply which is filtered by capacitors 1716. The VMM pins of chips 1702 and 1704 are coupled to a 24 volt source and filtered with an EMI filter 1717 and a capacitor 1718 to reduce the application of noise to the voltage source.

The PHASE, I1, I0 and VR pins of chips 1702 and 1704 are connected to the I/O pins of microprocessor 1902 (e.g. port 2, pins 0–3) by a resistor network, including resistors 1720, 1722, and 1724, which is connected to the 5 volt source as shown. This arrangement for the connection provides control from microprocessor 1902 to chips 1702 and 1704, which allows the current in stepping motor 100 to be controlled on a half-step basis (3 degree, 45 minute basis) to provide substantially equal torque between the armature and rotor of motor 100 throughout a revolution. Since the harmonics of the noise produced by motor 100 affect the circuitry of reader 10 and the harmonics of noise increase with fluctuations in motor torque, reduction of these fluctuations will improve circuitry performance. More specifically, the second harmonic of motor noise is created by the differences in full and half-step torque, and the higher order harmonics are created by deviation from a sinusoidal drive wave form and from the chopping action of chips 1702 and 1704.

Referring to the node 1726 at the VR pins of chips 1702 and 1704, the voltage at this point has a relative signal level of 100% when only one phase of chip 1702, 1704 is enabled, and a reduced signal level (e.g. 52%) when both phases are enabled. The exact reduction of signal level depends upon empirical data relating to drive currents and output torque for a particular motor 100. This produces a torque when both phases are enabled which is generally the same as the torque produced when a single phase is enabled. By way of specific example, resistors 1720 and 1722 are 620 ohms, resistor 1724 is 560 ohms, and resistor 1712 is 300 milliohms.

The enable pins I0 and I1, in cooperation with the signal level at the VR pin, produce levels corresponding to 0 winding current (min.) and the two relative levels described above (100% or 52%). The absolute magnitude of the 100% level is determined by resistor 1712 while the relative signal levels are determined by resistors 1720, 1722 and 1724. The absolute amplitude is also affected by the input resistance of the VR pin (e.g. 6000 ohms).

Pins MA and MB of each chip 1702 and 1704 are coupled to one of the windings of stepping motor 100 via an appropriate wiring arrangement which may include an associated 4 pin connector 1727.

Figure 18B:
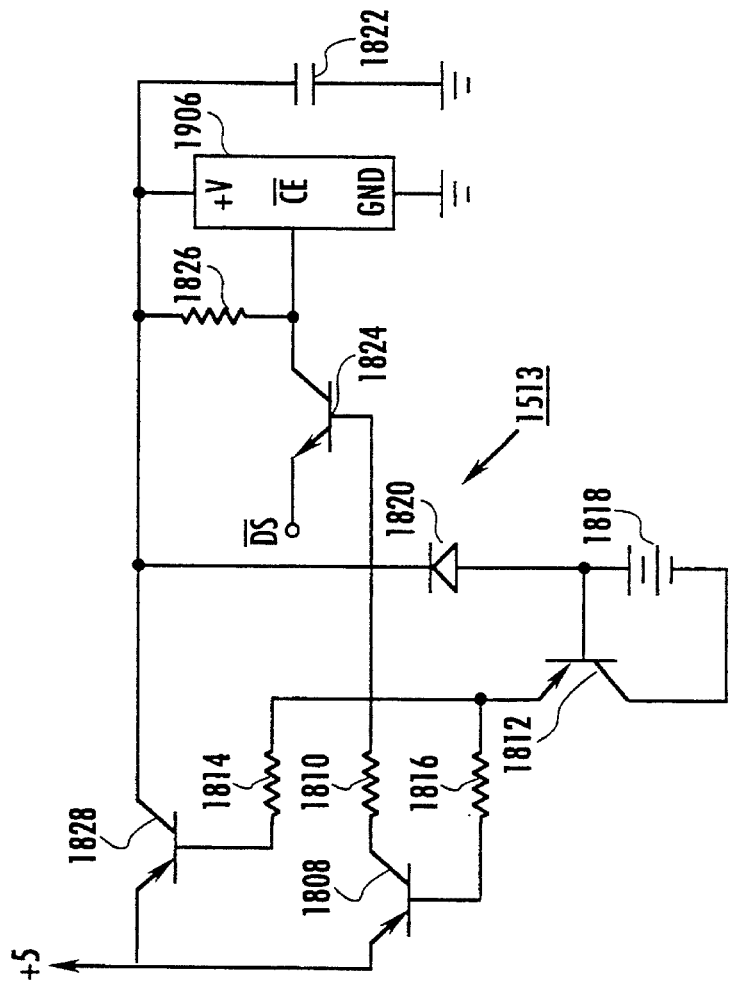
FIG. 18B is a schematic diagram of a battery backup circuit.
Figure 18A:
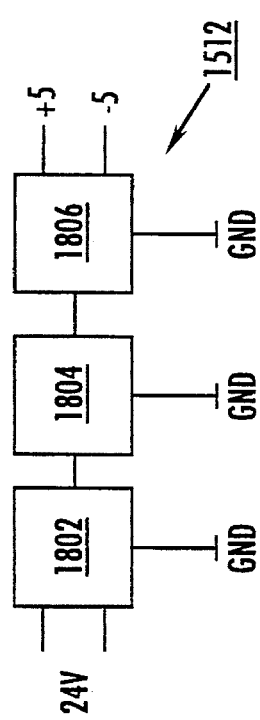
FIG. 18A is a schematic diagram of a power supply.

Referring to FIG. 18A, power supply 1512 is a conventional power supply including appropriate rectification, filtering and switch mode DC-to-DC conversion circuitry (1802, 1804 and 1806) to provide ±5 volts DC from either 24 VAC or 24 VDC.

Figure 19:
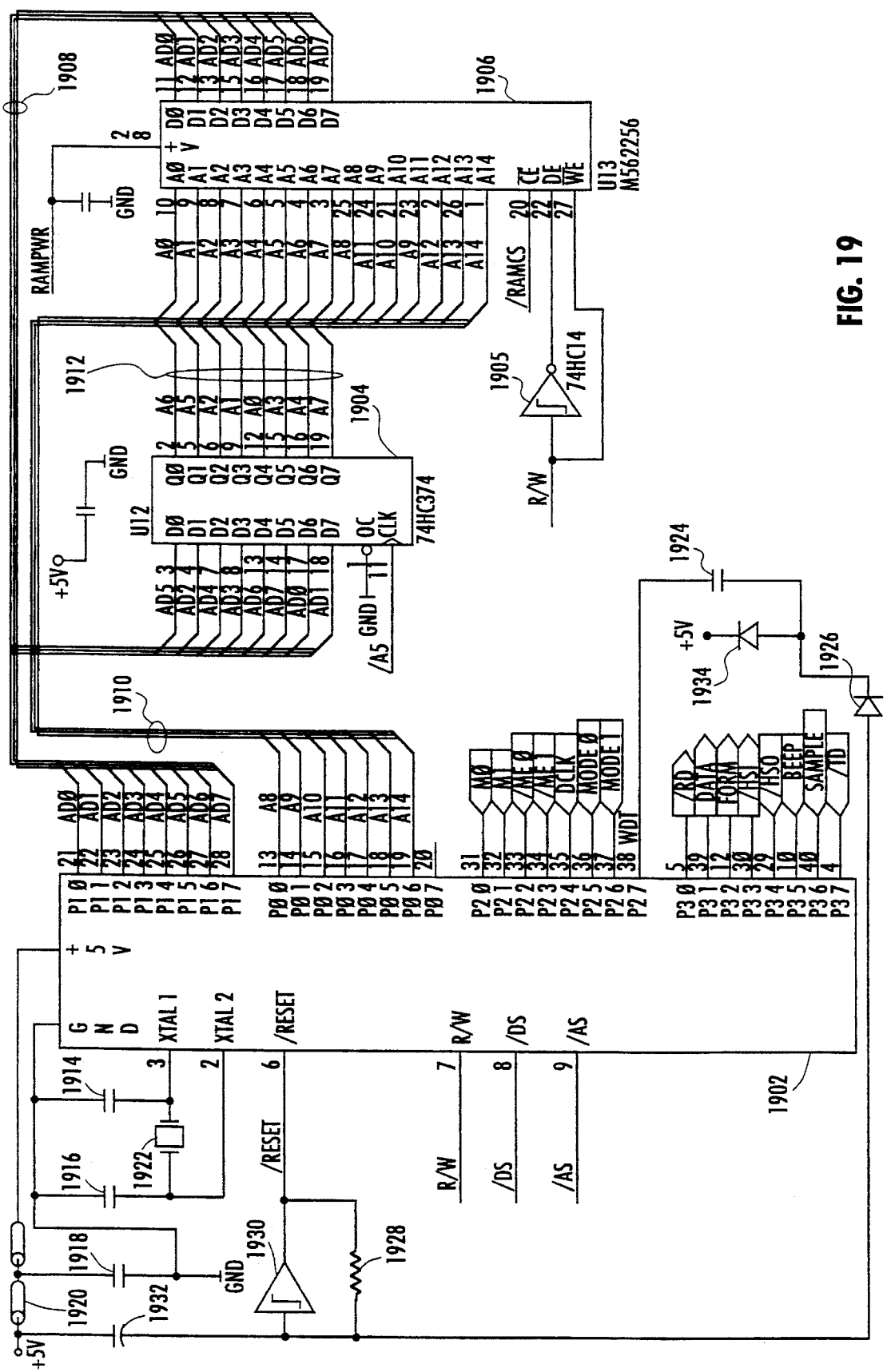
FIG. 19 is a schematic diagram of a processor circuit.

Referring to FIG. 19, the main ICs of processor circuit 1514 are digital computer or processor 1902, a latch 1904 and RAM 1906. Circuit 1514 also includes a multiplexed address and data bus 1908 coupled between port 1 of processor 1902, the input of latch 1904 and the data input of RAM 1906. A first address bus 1910 is coupled between port 0 of processor 1902 and the seven high address lines of RAM 1906. A second address bus 1912 is connected between the output of latch 1904 and the eight low address lines of RAM 1906. Buses 1908 and 1912 are 8-bit buses and bus 1910 is a 7-bit bus. In operation, the data from port 1 is both address data and data for storage in RAM 1906 which is multiplexed and buffered with latch 1904 such that the combination of ports 0 and 1 provides addressing for 32K bytes of memory and data transfer with 1 byte words. The read/write signal from pin R/W is decoded into discrete read and write signals by invertor 1905, where the R/W line is connected to pin WE of RAM 1906 and invertor 1905 is connected between the R/W line and pin QE of RAM 1906. By way of example, processor 1902 may be a Z8 microprocessor manufactured by Zilog Corp., latch 1904 may be a CMOS latch, and RAM 1906 may be a static RAM.

The +5 v pin of processor 1902 is connected to the 5 v supply 1812. The XTAL1, XTAL2 and GRND pins of processor 1902 are coupled to ground and 5 v supply 1812 with capacitors 1914, 1916, 1918, an EMI filter 1920, and a crystal 1922 as shown to clock processor 1902 at 14.7456 MHz.

Processor circuit 1514 includes a watchdog circuit having a capacitor 1924 coupled between port 2, line 7, and the cathode of a diode 1926 having its anode coupled to the reset line by the parallel arrangement of a resistor 1928 and an invertor 1930. The anode and cathode of diode 1926 are also coupled to 5 v supply 1812 by a capacitor 1932 and diode 1934, respectively. Components 1928–1932 form a relaxation oscillator for resetting processor 1902. Components 1924, 1926 and 1934, in conjunction with processor 1902, operate as a charge pump to prevent the relaxation oscillator from resetting processor 1902. Port 2, line 7 is pulsed high at a rate of at least 40 Hz for at least a duration of 2.5 microseconds to drive the charge pump.

Referring to FIG. 18B, battery backup circuit 1513 is connected to the CE line and V+ line of RAM 1906. Circuit 1513 is connected between 5 v supply 1812 and ground, where line CE is connected to the collector of an NPN transistor 1824. Line V+ is connected to the collector of transistor 1824 by resistor 1826 and the collector of an NPN transistor 1828. The emitter of transistor 1824 is connected to the /DS line of processor 1902 and the base is connected to the collector of an NPN transistor 1808 by a resistor 1810. The bases of transistors 1828 and 1808 are connected to the emitter of a PNP transistor 1812 by resistors 1814 and 1816, respectively. The collector of transistor 1812 is connected to ground, where a 3 volt lithium battery 1818 is connected between ground and the base of transistor 1812. The base of transistor 1812 is connected to the anode of a diode 1820 having its cathode connected to the V+ line of RAM 1706. The V+ line is also connected to ground by a capacitor 1822.

Circuit 1513 provides power to RAM 1906 and disables the chip enable signal (CE) when the voltage of the main 5 v logic supply is not sufficiently high (between 3 and 5 volts). In operation, when the logic supply is sufficiently high, the emitter-base junctions of transistors 1828 and 1808 are forward biased with conduction current limited by resistors 1814 and 1816 causing a small current to flow through the forward biased emitter-base junction of transistor 1812 (e.g. less than 10 microamps). The remainder of the emitter current flows through the collector of transistor 1812 to ground. When this occurs, the collector of transistor 1828 provides substantially a 5 v output to the V+ pin of RAM 1906, while reverse bias diode 1820 disconnects battery 1818. Capacitor 1822 stabilizes the voltage from transistor 1828.

With transistor 1808 conducting, current flows to the base of transistor 1824, as limited by resistor 1810, and a low signal at DS, if present, is coupled to the collector of transistor 1824. If DS is high, no current flows through the collector of transistor 1824 and the CE pin is pulled high by resistor 1826. Likewise, if there is insufficient voltage to forward bias transistors 1828, 1808 and 1812, the voltage at V+ on RAM 1906 falls until diode 1820 becomes forward biased and current is supplied by battery 1818. With transistor 1808 non-conducting, a low signal at pin DS (emitter of transistor 1824) is not capable of making transistor 1824 conduct so that the CE pin connected to the collector of transistor 1824 is pulled high by resistor 1826, thereby disabling RAM 1906 when the logic supply voltage is insufficiently high.

Figure 20:
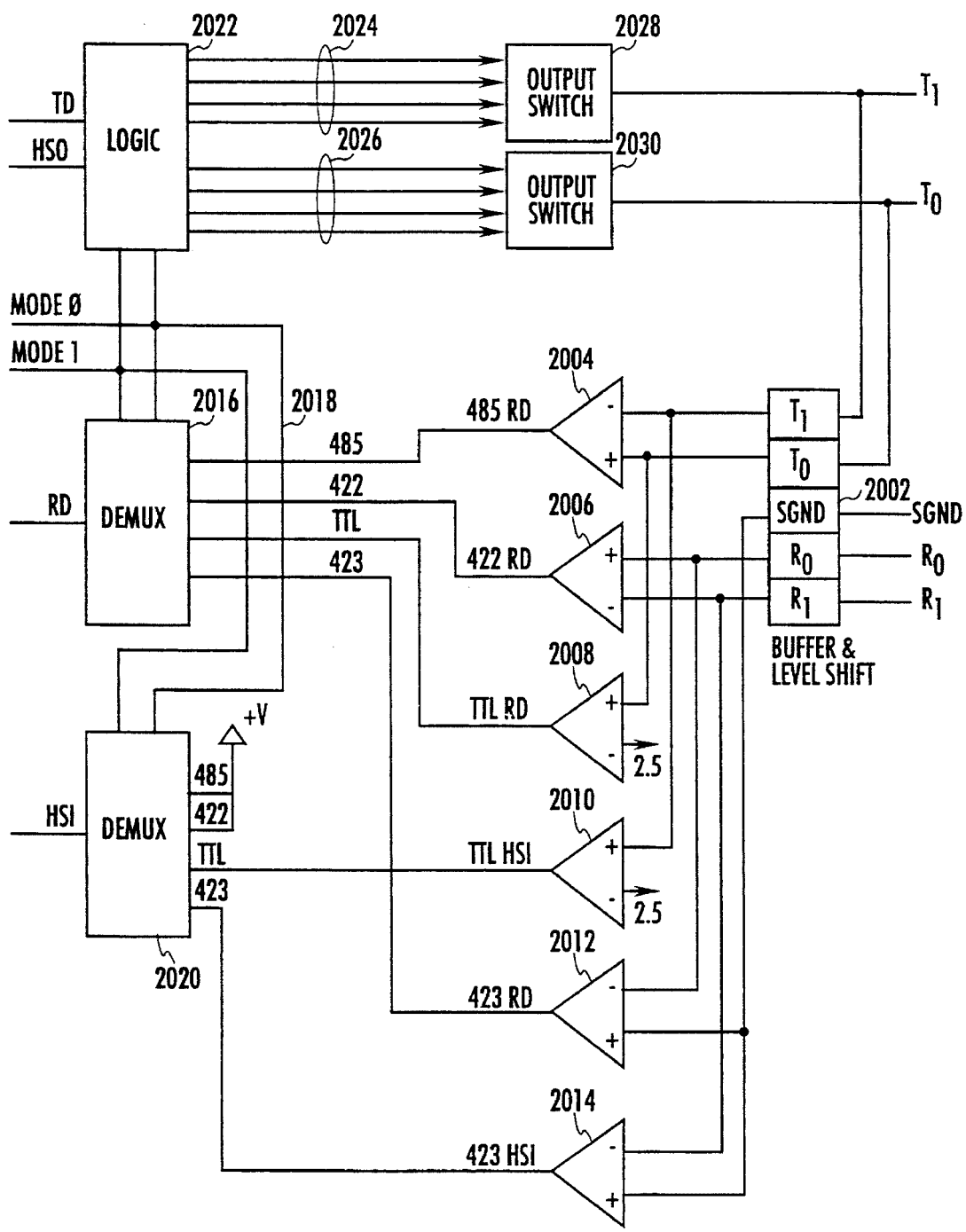
FIG. 20 is a schematic diagram of an interface selection circuit.

Referring to FIG. 20, interface circuit 1518 is coupled to ports 2 and 3. More specifically, circuit 1118 is coupled to the MODE0 and MODE1 pins of port 2, the TD and HSO pins of port 3, and the RD and HSI pins of port 3. Circuit 1518 is also coupled to a pair of 8 pin DIN connectors 1526 and 1528 which are arranged in parallel. Connectors 1526 and 1528 provide a communication link between check reader 10 and other devices.

Circuit 1518 includes 5 external interface terminals, R1, R0, SGND, T0 and T1, which are external device connections connected to the 8 pin DIN connector. The external interface terminals are all connected to a buffering and level shifting circuit 2002. Circuit 2002 presents a high impedance to the external interface signals, e.g. greater than 20 k ohms, and attenuates and shifts the input signal levels since the input common mode range exceeds the supply voltage of circuit 1518. The outputs of circuit 2002 are applied to 6 comparators 2004, 2006, 2008, 2010, 2012 and 2014. More specifically, the inverting and non-inverting inputs of comparator 2004 are connected to interface terminals T0 and T1, respectively; the inverting and non-inverting inputs of comparator 2006 are connected to interface terminals R0 and R1, respectively; the inverting and non-inverting inputs of comparator 2008 are connected to interface terminal T0 and 2.5 v, respectively; the inverting and non-inverting inputs of comparator 2010 are connected to interface terminal T1 and 2.5 v, respectively; the inverting and non-inverting inputs of comparator 2012 are connected to SGND and interface terminal R0, respectively; and the inverting and non-inverting inputs of comparator 2014 are connected to SGND and interface terminal R1, respectively.

The outputs of comparators 2004, 2006, 2008 and 2012 are connected to a demultiplexer 2016 which selects one signal from one of comparators 2004, 2006, 2008 and 2012, and applies the signal to digital interface terminal RD. The selection of the signal depends upon the signal applied to a two conductor bus 2018 which is coupled to the interface selection terminals MODE0 and MODE1 of processor 1902 (port 2, lines 5 and 6, respectively). The outputs of comparators 2010 and 2014 are connected to a demultiplexer 2020 which selects one signal from one of comparators 2010 and 2014, and applies the signal to digital interface terminal HSI of processor 1902 (port 3 line 3). The selection of the signal also depends upon the signal applied to bus 2018 which is coupled to the terminals MODE0 and MODE1.

Bus 2018 is also connected to a logic circuit 2022 having digital interface terminals coupled to the TD and HSO lines of processor 1902. Circuit 2022 is also coupled to a pair of 4 conductor buses 2024 and 2026 which are connected to output switches 2028 and 2030, respectively. Each switch 2028 and 2030 has a single output coupled to terminals T1 and T0 of circuit 2002, respectively. The outputs of switches 2028 and 2030 depend upon the status of buses 2024 and 2026 to provide the possibility of 4 unique analog drive levels at each switch 2028 and 2030.

Interface circuit 1518 provides an interface chip which allows the selection of a plurality of communication interface standards. Presently, circuit 1118 allows selective use of RS 485, RS 423, RS 422 and TTL communication standards. The signals on the external interface pins (TI, T0, SGND, R0, R1) depend upon the selected communication standard and are summarized in Table B below.

TABLE B

| | Description of Output Signals | | | |
|---|---|---|---|---|
| Signal | RS-423 | TTL | RS-422 | RS-485 |
| T1 | DTR | AUX | Tx− | Rx/Tx− |
| T0 | TD | DATA | TxT | Rx/Tx+ |
| SGND | SGND | | | |
| R0 | RD | | Rx+ | |
| R1 | DSR | | Rx− | |

Where DTR is DATA TERMINAL READY (output); TD is TRANSMITTED DATA (output); SGND is SIGNAL GROUND (input); RD is RECEIVED DATA (input); DSR is DATA SET READY (input); AUX is TTL HANDSHAKE (open collector); DATA is NON-INVERTED DATA (open collector); Tx+, Tx− are RS-422 TRANSMIT PAIR; Rx+, Rx− are RS-422 RECEIVE PAIR; and Rx/Tx+, Rx/Tx− are RS485 BIDIRECTIONAL PAIR.

The communication standard depends upon the status of bus 2018, i.e. the status of MODE0 and MODE1 pins as summarized in Table C below.

TABLE C

| | MODE0 | MODE1 | TD | HSO | T0 | T1 | RD Comparator Selected | HSI Comparator Selected |
|---|---|---|---|---|---|---|---|---|
| RS-423 | 0 | 0 | 0 | 0 | +V | +V | 2012 | 2014 |
| | 0 | 0 | 0 | 1 | +V | −V | 2012 | 2014 |
| | 0 | 0 | 1 | 0 | −V | +V | 2012 | 2014 |
| | 0 | 0 | 1 | 1 | −V | −V | 2012 | 2014 |
| TTL | 0 | 1 | 0 | 0 | GND | GND | 2008 | 2010 |
| | 0 | 1 | 0 | 1 | GND | PULLUP | 2008 | 2010 |
| | 0 | 1 | 1 | 0 | PULLUP | GND | 2008 | 2010 |
| | 0 | 1 | 1 | 1 | PULLUP | PULLUP | 2008 | 2010 |
| RS-422 | 1 | 0 | 0 | 0 | GND | +V | 2006 | +V |
| | 1 | 0 | 0 | 1 | N/C | N/C | 2006 | +V |
| | 1 | 0 | 1 | 0 | +V | GND | 2006 | +V |
| | 1 | 0 | 1 | 1 | N/C | N/C | 2006 | +V |
| RS-485 | 1 | 1 | 0 | 0 | GND | +V | 2004 | +V |
| | 1 | 1 | 0 | 1 | N/C | N/C | 2004 | +V |
| | 1 | 1 | 1 | 0 | +V | GND | 2004 | +V |
| | 1 | 1 | 1 | 1 | N/C | N/C | 2004 | +V |

Referring to Table C above, the analog drive levels of external interface pins T0 and T1 are summarized in conjunction with the statuses for interface selection pins MODE0 and MODE1, and digital interface pins TD and HSO. The T0 and T1 pins may have 5 drive levels including +V, −V, GND, PULLUP, and NC. For example, in RS-423 communication if TD and HSO are both low, the drive levels at T0 and T1 are V+ and V+, respectively.

Presently, there is no single chip or simple combination of chips which allow a single device to interface interchangeably with multiple interface standards such as RS-232 (RS-423), RS-485, RS-422 and TTL. In the preferred embodiment, circuit 1118 will be fabricated on a single chip. The single chip will be an integrated circuit which allows CMOS/TTL levels to be converted to those required for the above-referenced interface standards. This single chip configuration is important where cost constraints are required and space limitations are critical. It is contemplated that a single chip having the disclosed components will be over 10 times smaller than the same circuit fabricated with discrete components on a circuit board. Additionally, the cost may be reduced by a factor in the range of 10-to-1.

Figure 21:
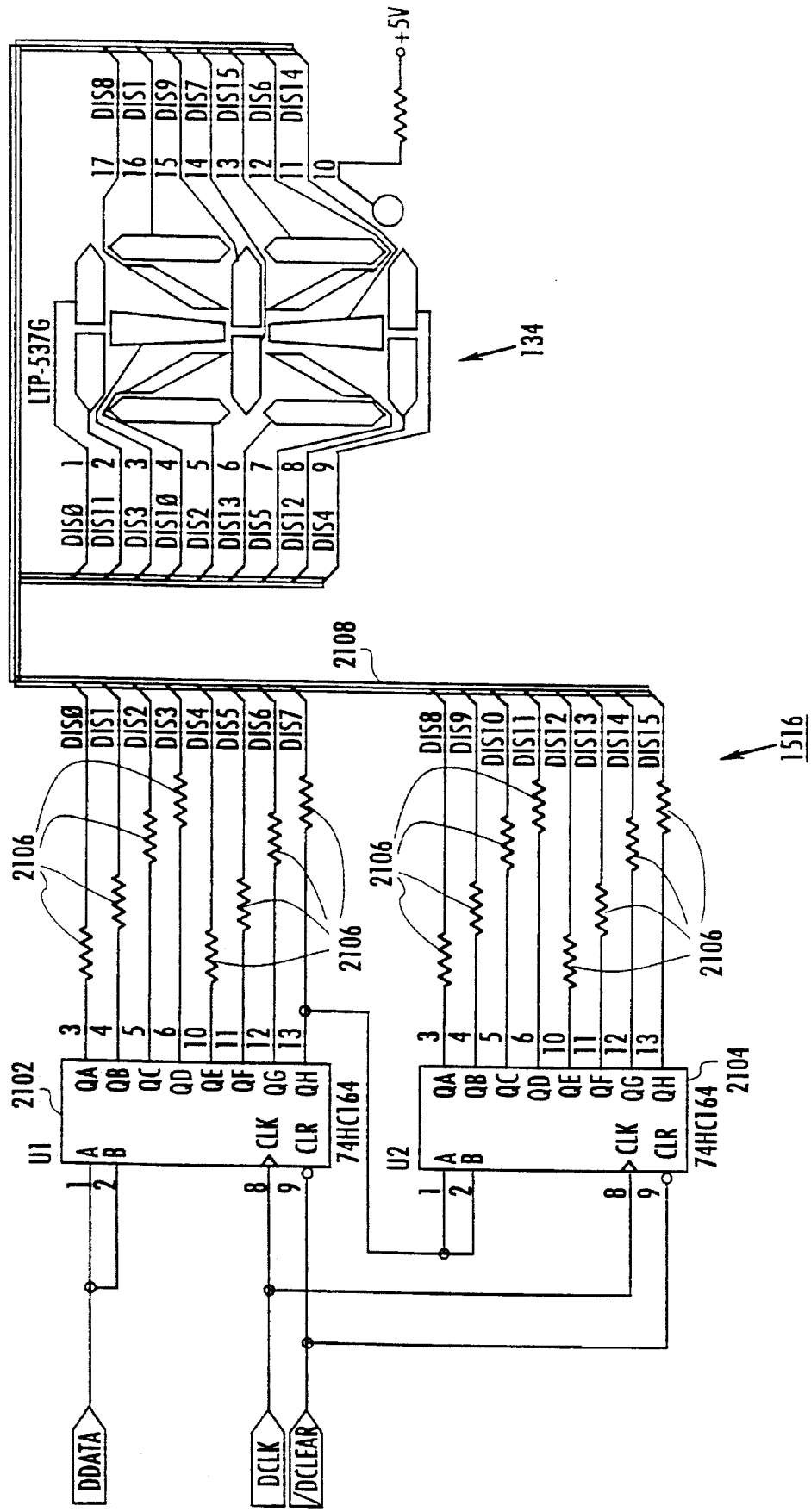
FIG. 21 is a schematic diagram of a display circuit.

Referring to FIG. 21, display circuit 1516 includes LED display 134, a pair of shift registers 2102, 2104, a plurality of resistors 2106 and a data bus 2108. Registers 2102 and 2104 are coupled in parallel to bus 2108 by resistor 2106. Bus 2108 is coupled to the segments of display 134, and the status of registers 2102 and 2104 determines which of the 16 segments are illuminated. Pins A and B of register 2102 are coupled to port 2, line 0 of microprocessor 1902, pins CLK of both registers are coupled to port 2, line 4, and pins CLR of both registers are coupled to port 2, line 4. Pins A and B of register 2104 are coupled to pin QH of register 2102, and 16 bits of data are clocked into registers QA–QH of registers 2102 and 2104 from port 2, line 0. This arrangement allows the application of display data to display 134 using serial data transfer from microprocessor 1902.

By way of example, registers 2102 and 2104 may be 74HC164s and display 134 may be a LTP-537G.

Figure 22:
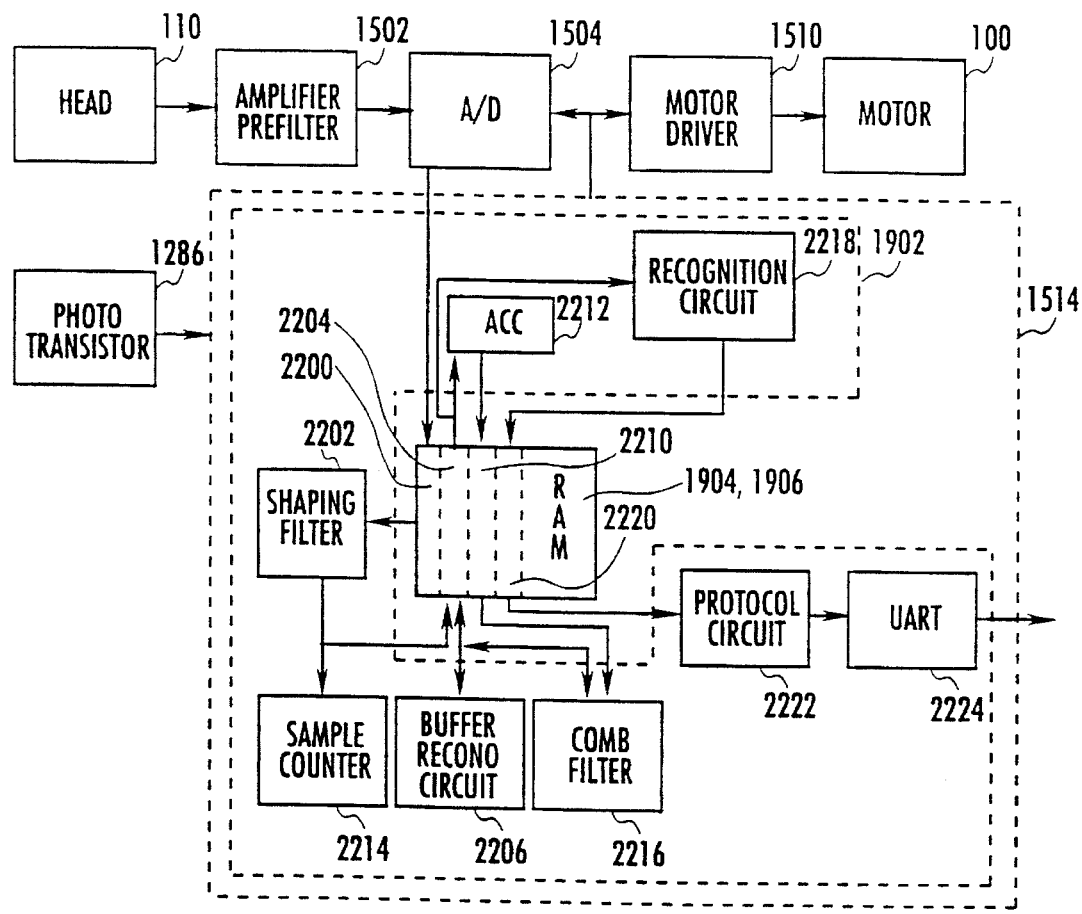
FIG. 22 is a block diagram of the programmed processor circuit.

The programming of processor circuit 1514 will now be described in reference to FIG. 22. In general, the programming for circuit 1514 is designed to configure microprocessor 1902 to provide control circuits for performing the various control functions of check reader 10. While the programming is set up to provide a number of control circuits within processor 1902, the most relevant control circuits are shaping filter circuit 2202, buffer reconfiguration circuit 2206, sample counter circuit 2214, accumulator circuit 2212, comb filter circuit 2216, recognition circuit 2218, and protocol conversion circuit 2222. The source code for the relevant programming is included in Appendix A below. Before describing these circuits in detail, the sample timing and motor control will first be discussed.

Processor 1902 simultaneously applies the appropriate signals to A/D circuit 1504 and motor drive circuit 1510 such that motor 100 is stepped one increment at the time the sample from A/D 1504 is applied to processing circuit 1514. Each sample from A/D 1514 is applied by processor 1902 to a circular buffer 2200 which is set up in RAM 1906 with a memory size sufficient to store 14 samples.

Processor 1902 is programmed to provide a shaping filter circuit 2203 which compensates for the frequency response of the combination of head 110, amplifier and prefilter circuit 1502, and A/D circuit 1504. In general, filtering circuit 2202 provides a time-domain convolutional filter between its input and output. In operation, the filter operates on data buffer 2200. Buffer 2200 is a 14 byte shift register where each data point is advanced one position for each new data point, from A/D 1504, with the oldest being discarded. RAM 1906 also includes 14 bytes of information (configuration data) corresponding to the characteristics of the frequency response of head 112, amplifier/preamplifier circuit 1502, and A/D 1504 which is written into memory during set-up. Each time a data point is written into buffer 2200, filter circuit 2202 performs its filtering process using the 14 samples to produce a data point which is written into a circular buffer 2204.

In particular, shaping filter circuit 2202 operates for each sample written into buffer 2200 from A/D 1504. For each operation, the configuration data is multiplied with the data in buffer 2200, summed and then scaled. In particular, each of the 14 values of configuration data K=0 to K=13 corresponds to one of the 14 memory locations in buffer 2200. Each configuration data value is always multiplied with the data point in the associated memory location of buffer 2200. Thus, to carry out the filtering process, each configuration value is multiplied by the data in the associated memory location of buffer 2200, the products are summed, and the sum is divided by a scaling factor such as 14. Subsequently, the result of this filtering process is written into circular buffer 2204.

In addition to selecting the configuration data values based upon the frequency response of head 110, circuit 1502 and A/D 1504, these values may also be based upon the type of character recognition reader 10 is performing, e.g. E-13 or CMC-7 character recognition.

To accomplish all of the multiplication steps required during the time period between the application of each data point from A/D 1504 to circular buffer 2200, the following modified multiply process is used in place of a typical sequential multiplication process. In general, the process reduces the number of operations (shifts) which would be required with a typical multiply process. For purposes of the description of the procedure, the samples in buffer 2200 will be referred to as S0 to S13 with S0 being the last in and S13 being the first in. The configuration data will be referred to as K0 to K13 where the multiplication process multiplies S0 to S13 with K0 to K13, respectively.

To carry out the process, data K0 to K13 are stored as factors of powers of 2. For example, a coefficient of 5 is 1+4, a coefficient of 4 is 4, a coefficient of 3 is 1+2, a coefficient of 6 is 2+4, etc. To perform the multiply process, the sample data S0 to S13 are multiplied by place values of coefficients K0 to K13 having the highest magnitude, (e.g. 4) and are multiplied by two. Subsequently, the same step is performed for the sample data (S0 to S13) for the next highest place value (e.g. 2) and so on until this step is performed for all place values. Inherently, the products of the steps are added to provide the overall products for the multiply process.

The following is an example of the process with numbers. Assume all samples S0 to S13 are various values from A–D 1504, with K0 to K13 as follows:

| VALUE   | PLACE VALUES |
|---------|--------------|
| K0 = 1  | 1            |
| K1 = 5  | 4 + 1        |
| K2 = 6  | 4 + 2        |
| K3 = 4  | 4            |
| K4 = 2  | 2            |
| K5 = 3  | 2 + 1        |
| K6 = 5  | 4 + 1        |
| K7 = 7  | 4 + 2 + 1    |
| K8 = 6  | 4 + 2        |
| K9 = 4  | 4            |
| K10 = 1 | 1            |
| K11 = 1 | 1            |
| K12 = 1 | 1            |
| K13 = 1 | 1            |

The first step would be to add S0-S3 and S6-S9, then multiply by 2. The second step would be to add S2, S4, S5, S7 and S8, and again multiply by 2. The third step would be to add S0, S1, S5-S7 and S11-S13. Finally, the sum would be divided by 14.

As discussed above, the operation of motor drive circuit 1510 and the initiation of sampling at A/D 1504 is provided by a signal from photo transistor 132 which is applied to processing circuit 1514. The signal from photo transistor 132 is in the form of a pulse and is produced when the edge of the document passes over sensor port 38. Thus, the passing of the left edge 170 of check over sensor port 38 will cause processing circuit to initiate the application of signals to motor drive circuit 1510 and sampling signals to A/D 1504, and the passage of the right-hand edge 160 of check 158 past sensor port 38 will discontinue the application of stepping signals to motor drive 1510 and sampling signals to A/D 1504. There is an exception to this sequence in that the passage of an edge of a check over sensor port 38 will not initiate the reading process unless the interrupt associated photo transistor 132 is enabled. This permits check reader 10 to complete the character recognition process for a single check before a second check is passed through check reader 10.

Since photo transistor 132 is located to sense the edge of a check passing over sensor port 38 and sensor port 38 is located before drive wheel 92 along the path of movement of a check 158 through reader 10, the passage of a check past port 38 will cause processing circuit 1514 to initiate and continue the operation of motor 100 and the sampling of signals from head 110 via motor drive 1510 and A/D 1504, respectively, regardless of whether or not a check has actually been engaged between drive wheel 92 and the top surface of read head 110. Accordingly, since buffer 2204 is a circular buffer and does not have unlimited size (e.g. 8KB), the samples taken from A/D 1504 are stored sequentially and written over the samples which were first to be stored into the buffer. Thus, samples will be stored in buffers 2200 and 2204, and motor 100 will be stepped (driven) until right-hand edge 160 of check 158 is sensed by photo transistor 132. As a result, at the end of a read cycle, buffer 2204 will include data which is representative of the MICR information which is arranged in buffer 2204 in such a way which does not correspond to right-to-left reading of check 158.

After completion of a read cycle, buffer reconfiguration circuit 2206 of processor 1902 rearranges the data in circular buffer 2204 to put it in order as if the check was read from right to left. Circuit 2206 is required since reader 10 reads the MICR information from a check 158 from the left to the right, whereas typical readers read MICR information from the right to the left. Accordingly, for program processor 1902 to have a recognition circuit 2218 capable of using generally standard recognition methods, it is most efficient to rearrange the data in circular buffer 2204. Rearrangement places the data in an order which is sequential and begins from the data representative of the rightmost MICR information and ending with the data which is representative of the leftmost MICR information.

Circuit 2206 utilizes a pointer located at the memory location of the last data written into buffer 2204. Circuit 2206 looks at the data above and below the pointer and reconfigures the data above the pointer. After reconfiguration the first is last and the last is first, with all intermediate data correspondingly interchanged. The data below the pointer is reconfigured to make the last first and the first last, with the intervening data correspondingly interchanged. For example, if buffer 2204 were an 8 element buffer (n=0 to n−7), where element n=5 (left most) was the first element written in and element n=4 (right most) was the last element written in, with the pointer at element n=4, circuit 2206 would reconfigure the data in the following order: N4, N3, N2, N1, N0, N7, N6, N5. As can be seen, this reconfiguration places the data in sequential order from the beginning of the read cycle (element N5) to the end of the read cycle (element N4) in order as if read from right to left.

Processor 1902 also operates as a sample counter 2214. Sample counter 2214 keeps track of the number of samples which are written into buffer 2204 and is important in the situation where buffer 2204 is not completely filled during a read cycle (the time between motor run start and sample start and motor run stop and sample stop). For example, buffer 2204 has enough memory to store all of the samples taken while reading a check which is 8 inches long. As discussed above by way of example, check 158 was described as a personal check which is only 6 inches long. Accordingly, where a personal check is fed to the feeder, without hesitation at port 38, buffer 2200 will not be completely filled with sample data and the count at sample counter 2214 will be important to determine what portion of the data in buffer 2200 is representative of the MICR information on the check which was read. Thus, where the sample count at 2214 is less than the capacity of buffer 2204, reconfiguration circuit 2206 accounts for the difference before reconfiguring.

As the data is written into circular buffer 2204, it is also written into a third buffer 2210 via an accumulator circuit 2212. Accumulator circuit 2212 operates to sum every n=1 to n=128 data point written into buffer 2204, and write the sums into the 128 locations of buffer 2210. At the end of a read cycle, each sum is divided by the number of samples which were accumulated for the particular sum.

Buffer 2210 is sized based upon the sampling frequency of A/D 1504, and the number of samples corresponding to one cycle of a frequency which should be filtered from the data stored in circular buffer 2204. In the present embodiment, circular buffer 2210 stores 128 data points, which corresponds to one cycle of a 60 Hz (power line) signal which is filtered from the data stored in circular buffer 2204. In particular, the size of buffer 2210 corresponds to 16 steps per cycles of motor drive signal (30° rotation) of the motor, and 8 rotations of the motor for each cycle of the 60 Hz frequency (8*16=128 data points).

Subsequent to reconfiguring the order of the data in buffer 2204, comb filter 2216 filters the data in buffer 2204 based upon the data in buffer 2210. More specifically, filter circuit 2216 reads the first set of 128 values in buffer 2204, subtracts the corresponding 128 data points in buffer 2210, and rewrites the differences back into the appropriate locations in buffer 2204. Filter 2216 repeats this process for every set of 128 data points in buffer 2204 until all of the data points have been filtered.

The use of a 128 point buffer for buffer 2210 is based upon the filter (60 Hz) which is being filtered from the data in buffer 2204 and the number of samples written from A/D 1504 to buffer 2204 during one cycle of the filtered frequency. However, depending upon the application, the frequency of the signal desired to be filtered from the data in buffer 2204 may change, depending upon the application. Thus, the size of buffer 2210 would be modified accordingly. However, to maintain correspondence between the N data points in buffer 2210 and the sets of N data points in buffer 2204, the size of buffer 2204 must be an integer multiple of the size of buffer 2210. Also buffer 2210 must be an integer multiple of the number of samples corresponding to a single cycle of the motor drive signal (30° rotation).

Processor 1902 is programmed to provide a recognition circuit 2218 which recognizes a particular magnetic character set being read from check 158. Circuit 2218 is provided by programming using conventional recognition procedures, and operates to read the data from buffer 2204, reconfigure the data according to the procedures for the particular character recognition, and rewrite the data into buffer 2220. The data from buffer 2220 is output after being reconfigured in a conventional manner by protocol circuit 2222 to convert the data into a form having the appropriate protocol for the desired communication. The data from protocol circuit 2222 is applied to the UART 2224 of microprocessor 1902 and output at port 3, lines 0 and 7.

It will be understood that the foregoing description is of preferred exemplary embodiments of the present invention, and the invention and inventive modifications thereof are not limited to the details shown and described. For example, some of the inventive features are directed to hand-fed check readers (i.e. check readers where an operator applies the checks to the reader, rather than having a feed device batch feed checks to the reader at high speeds) and other features are directed more generally to devices which interact (i.e. read or write) with the magnetic information of a document. Additionally, the details of the document drive mechanism, housing, and software/microprocessor combination may be modified to tailor the check reader to a particular situation. For example, the system may be modified to read or check magnetic information from paper currency. These and other modifications may be made without departing from the scope of the invention as expressed in the appended claims.

```
_FORM   ;IRQ0 -- Top of Form
        ;
        ; 1. Set Form Down Counter
        ;
        push    RP
$10     srp     #0
        ld      R7,#%BC          ;low byte
        ld      R6,#3            ;High byte counter
        and     %FB,#%FE         ;Disable form interrupt
        pop     RP
        iret _ADC    ;IRQ2 -- Analog to Digital Converter Interrupt
        ;
        ; 1. Get next value from timer and enable next sample
        ;
        push    RP               ;save register pointer
$00     srp     #Zvalues         ;Select Z registers
        ld      R0,T1            ;get 20 data value from Timer 1
        ld      TMR,#%5E         ;Reload T1 counter
        ;Values in Rn are in the range FFh to 80h
```

```
; 1. Switch to filter variable set and perform filtering
;
$10     ld      R15,R4           ;0000100000000000
        add     R15,R5           ;0000100000000000
        ld      R14,#1           ;there must be a carry
        add     R15,R6           ;0000110000000000
        add     R14,#0           ;0000111100000000
        add     R15,R7           ;0000111100000000
        add     R15,R8           ;0000111110000000
        add     R14,#0           ;0000111110000000
        adc     R15,R9           ;0000111111100000
        add     R14,#0           ;0000111111100000
        adc     R15,R15          ;0000222222000000
        add     R15,R0           ;1000222222000000
        add     R14,#0           ;1000222222000000
        adc     R15,R1           ;1100222222200000
        add     R14,#0           ;1100222222200000
        adc     R15,R2           ;1110222222200000
        add     R14,#0           ;1110222222200000
        adc     R15,R3           ;1111222222200000
        add     R14,#0           ;1111222222200000
        adc     R15,R5           ;1112322222000000
        add     R14,#0           ;1112322222000000
        adc     R15,R6           ;1112332222000000
        add     R14,#0           ;1112332222000000
        adc     R15,R7           ;1112333322000000
        add     R14,#0           ;1112333322000000
        adc     R15,R8           ;1112333322000000
        add     R14,#0           ;1112333322000000
        adc     R15,R10          ;1112333332100000
        add     R14,#0           ;1112333332100000
        adc     R15,R11          ;1112333332110000
        add     R14,#0           ;1112333332110000
        adc     R15,R12          ;1112333332111000
        add     R14,#0           ;1112333332111000
        adc     R15,R13          ;1112333332111100
        add     R14,#0           ;1112333332111100
        sra     R14              ;/2
        rrc     R15
        sra     R14              ;/4
        rrc     R15
        sra     R14              ;/8
        sub     R15,#%C0         ;remove DC offset, leaving a new
        sbc     R14,#0           ;offset of 128.

; 2. delay each coefficient by one sample period
;
$20     ld      R11,R10          ;Z.n := Z.n-1
        ld      R10,R9
        ld      R9,R8
        ld      R8,R7
```

APPENDIX A

```
        ld    R7,R6
        ld    R6,R5
        ld    R5,R4
        ld    R4,R3
        ld    R3,R2
        ld    R2,R1
        ld    R1,R0
;
; 3. Copy data to pointer RR0 and switch to pointer variable set
;
$30     ld    _Poynt,R14        ;get high byte
        ld    _Poynt+1,R15      ;get low byte
        srp   #_Poynt           ;get pointer register set
;
; 4. Save data in data buffer at Index, update Index
;
$40     lde   R3,@Index         ;get old value just in case
        lde   @Index,R1         ;save new value in buffer
        sub   R1,R3             ;subtract out old value
        sbc   R0,#0             ;fixup high byte
        incw  Index             ;point to next data
        jr    nz,$50            ;see if we need to wrap pointer
        ld    IndexH,#>Dbuf     ;high byte of base address
        ld    IndexL,#<Dbuf     ;low byte of base address
;
; The data buffer is preloaded with zeros at initialization
; so that we always subtract the old data value in calculating
; the npath difference. During the first pass through the
; buffer, the data values on a given path are summed.
; Thereafter, only the differences are summed.
;
; Note that the data values themselves (e.g. Dbuf[index]) are
; stored in offset binary (unsigned numbers from 0 to 255,
; with 128 representing zero) while the 16 bit path value is
; a 16-bit 2's complement binary number.
;
; When the path values are divided by their path length and
; subtracted from the original data, the offset will be lost
; and the data values will then be signed 2's complement byte
; integers.
;
; Be careful when adding and subtracting byte integers from
; 16 bit integers, particularly avoid the following over-
; simplification:
;
        ld    R3,#-1            ;byte integer value
        add   R1,R3             ;subtract low byte
        adc   R0,#0             ;fix up high byte.
;
; In the preceding example, the wrong result is obtained due
; to the invalid assumption that the high byte of the byte
; integer is zero. In fact, 255 was added to the 16 number
; instead of subtracting 1 as intended. The following example
; will work correctly:
;
        ld    R3,#-1            ;byte integer value
        or    R3,R3             ;set sign flag
        jr    m,$1              ;skip if minus
        add   R1,R3             ;add low bytes
        adc   R0,#0             ;fix up high byte
        jr    $2                ;exit
$1      add   R1,R3             ;add low bytes
        adc   R0,#-1            ;fix up high byte
$2      ...
;
; 5. Update counter
;
$50     decw  Count             ;decrement counter
        jr    nz,$60            ;if buffer is not full, we okay
        incw  Count             ;reset counter if full
;
; Counter is initially loaded with the buffer size and is
; decremented to keep this interrupt code efficient. In
; post processing the count value is subtracted from the
; buffer size to determine the actual buffer length.
;
; 6. Add data to Path variable and update Path pointer
;
$60     lde   R2,@Path          ;get Path variable
        inc   PathL             ;point to low bytes
        lde   R3,@Path          ;get low byte
        add   R3,R1             ;add low bytes
        adc   R2,R0             ;add high bytes
        lde   @Path,R3          ;save low byte
        dec   PathL             ;point to high byte
        lde   @Path,R2          ;save high byte
        add   PathL,#2          ;point to next one
;
; 7. restore register pointer and exit
;
$70     pop   _RP               ;restore pointer
        iret                    ;and that's all
```

```
_TX             ;IRQ4 -- Serial Output, T0 interrupt
                ;
                ; 1. Test for motor event
                ;
        push    RP              ;save register pointer
        srp     #0              ;point to system registers
        ldc     R2,@RR12        ;output the current motor phase
        incw    RR12
        inc     R11             ;point to next
        jr      nz,$11          ;increment phase counter
        ld      R12,#>Mtab      ;skip if we are not at end of table
        ld      R13,#<Mtab
        ld      R11,#-16
$10     cp      R5,#<EndAccel   ;is R5 at final value?
        jr      z,$20           ;if yes then continue
        ldc     R10,@RR4        ;Get prescale value
        ld      %F5,R10         ;load prescale
        incw    RR4             ;point to timeconst
        ldc     R10,@RR4        ;get timeconst
        ld      %F4,R10         ;load timeconst
        incw    RR4             ;point to next prescale
$11     cp      R5,#<EndAccel
        jr      nz,$21
        clr     %F2             ;count = 256
        ld      %F3,#%05        ;input is gated clock
        ld      %F1,#%5E        ;Reload T1 counter
        clr     %FA             ;Clear pending interrupts
        ld      %FB,#%15        ;Enable ADC interrupt
        clr     R14             ;Clear sample counter
        clr     R15
        jr      $21
                ;
                ; 2. Test for end of form
                ;
$20     incw    RR14            ;increment idle counter
        or      R14,R14         ;check to see if we are just idling
        jp      pl,$21          ;continue if positive
        ld      R2,#%BC         ;reset
$21A    jr      $21A            ;hang around the house waiting to die
$21     cp      R6,0            ;is R6 = 0?
        jr      z,$30           ;exit if so, 0 means no tof
        dec     R7              ;decrement counter
        jr      nz,$30          ;count remaining, ignore
        dec     R6              ;did high byte just CHANGE to zero?
        jp      z,dump          ;1-2-3 skiddoo if so.
                ;
                ; 3. Done, exit
                ;
$30     pop     RP              ;restore register pointer
        iret Finit   push    RP
        srp     #_Poynt
                ;1. Clear all Path variables and output packet
        ld      R0,#>Path128    ;bottom of all micr data
        clr     R1              ;mother of all micr data
        clr     R2
        lde     @RR0,R2
        incw    RR0
        jr      nz,$11

;2. Initialize Path to Path128
$10     ld      PathH,#>Path128
        clr     PathL ;3. Initialize Index to start of Dbuf
$11     ld      IndexH,#>Dbuf
        clr     IndexL ;4. Initialize Count to (0-Dbuf)+1
        ld      CountH,#>(-Dbuf)
        ld      CountL,#1

;5. Initialize Filter Constants
$50     srp     #Zvalues
        ld      R15,#%C0        ;DC offset
        ld      R14,#14         ;start with 213
        .reg    _Zvalues-1      ;prevent syntax errors
2x      ld      _2x(R14),R15    ;for each Z value, set DC offset
$51     djnz    R14,$51         ;keep going if not done ;7. Restore register pointer and return
        pop     RP              ;restore register pointer
        ret
```

```
Fpost   push    RP
; 1. Select Pointer register set and calculate count value
$10     srp     #Poynt              ;Select Filter Pointers
        com     CountL              ;complement low
        com     CountH              ;complement high
        add     CountL,#2           ;get correct count value
        adc     CountH,#>(-Dbuf)    ;instead of some other value.

; 2.0 Divide Count by 128 to determine number of values in each Path
;     from PathL to FEh.
$20     ld      R5,CountL           ;get low byte
        ld      R2,CountH           ;get high byte
        rl      R5                  ;shift msb to carry
        rlc     R2                  ;n/128, short path length
        rrc     R5                  ;n mod 128, number of long paths
;
;       At this point, R3 contains the number of paths ending at
;       PathL-2 which should be divided by R2+1. The rest of the
;       paths should just be divided by R2.
;
; 3. Divide each Path sum by number of values in each Path
$30     ld      R4,#128             ;total number of paths
        sub     R4,R5               ;less long paths is quantity of short
        lde     R0,@Path            ;get high byte
        inc     PathL               ;point to low byte
        lde     R1,@Path            ;get low byte
$31     ld      R3,R2               ;get count value
        sra     R3                  ;divide it by 2
        add     R1,R3               ;eliminate round off error
        adc     R0,#0               ;fix up high byte
        call    divide              ;divide by count
        lde     @Path,R1            ;put path value back
        inc     PathL               ;point to next path
        djnz    R4,$31              ;update next short path
        add     R4,R5               ;copy number of long paths and set z
        jr      z,$40               ;We are done if no (more) long paths
        clr     R5                  ;reset long path counter
        inc     R2                  ;use divisor + 1
        jr      $31
;
;       PathL should now be pointing to its original position.
;
; 4. Reverse order of data in buffer, realigning it so that
;    dbuf[Index-1] will now correspond to dbuf[0].
$40     ld      R0,IndexH           ;get high byte of Index to LH pointer
        ld      R1,IndexL           ;get low byte
        ld      R2,#XFF             ;point to end of memory
        ld      R3,#XFF             ;point to very last byte
        call    Swap                ;swap right half of buffer
        decw    Index               ;Index is now right pointer
        ld      R0,#>Dbuf           ;high byte of Dbuf pointer to LH pointer
        ld      R1,#<Dbuf           ;low byte of Dbuf pointer to LH pointer
        ld      R2,IndexH           ;high byte of tail to RH pointer
        ld      R3,IndexL           ;low byte of tail to LH pointer
        call    Swap                ;swap left half of Dbuf ; 5. Fix up path pointer so that pathL points to path 0 instead
;    of path 255.
$50     dec     PathL               ;point to previous path entry low byte ; 7. For each of the 128 paths, subtract path mean from the
;    original data.
$70     clr     R7                  ;path counter and data index
        clr     R2                  ;contains a zero to speed up
        lde     R1,@Path            ;get path mean value
$71     ld      R6,#>Dbuf           ;start with first data byte in path
        sub     R0,R1               ;get data byte
        lde     @R6,R0              ;subtract path mean value
        inc     R6                  ;put data byte back
        jr      nz,$72              ;add 256 (2 * path length)
        sub     PathL,#2            ;update next data point
        inc     R7                  ;update path pointer to next value
$72     jr      nz,$71              ;update data pointer to next path
                                    ;update next path ; 8. Fix up all pointers and exit
$80     ld      IndexH,#>Dbuf       ;point to start of fixed up data
        clr     IndexL              ;fix low byte
```

```
        pop     RP              ;restore register pointer
        ret

Swap:
; 0. Save Registers used
;
$00     push    R7              ;save R7
        push    R6              ;save R6
        push    R5              ;save R5
        push    R4              ;save R4
;
; 1. Calculate number to swap, return if zero
;
$10     ld      R7,R3           ;get low byte to count
        ld      R6,R2           ;get high byte to count
        sub     R7,R1           ;subtract low bytes
        sbc     R6,R0           ;subtract high bytes
        sra     R6              ;divide high byte by two
        rrc     R7              ;divide low byte by two
        incw    RR6             ;computed byte count is off by one
        jr      le,$40          ;if no bytes to swap, skip to exit
;
; 2. Swap in place
;
$20     lde     R4,@RR0         ;get Left Hand value
        lde     R5,@RR2         ;get Right Hand value
        lde     @RR0,R5         ;swap LH
        lde     @RR2,R4         ;swap RH
;
; 3. See if there are more bytes to swap
;
$30     incw    RR0             ;increment left pointer
        decw    RR2             ;decrement right pointer
        decw    RR6             ;are there more bytes to swap?
        jr      nz,$20          ;continue if so
;
; 4. Restore Registers and Return
;
$40     pop     R4              ;then restore R4
        pop     R5              ;else restore R5
        pop     R6              ;then restore R6
        pop     R7              ;else restore R7
        ret                     ;and return
```

What is claimed is:

1. A device for reading magnetically encoded information from documents which are hand-fed to the device, each of the documents having a first planar surface, the device comprising:

a housing including a second planar surface having a document guide rail, the document guide rail extending upwardly from the second planar surface and along a direction of travel for a document parallel to the second planar surface, wherein the second planar surface is configured to slidably support the first planar surface of a document;

a magnetic read head including a top surface, wherein the magnetic read head is mechanically supported relative to the housing in a position suitable to permit the magnetic read head to read information from the first planar surface of the document;

a circuit board mechanically supported by the housing and being fabricated from a material, the circuit board including a support portion and a support member, the support portion and the support member being fabricated from the material such that the support portion is suspended relative to the support member to permit resilient deflection of the support portion relative to the support member, wherein the magnetic read head is mechanically supported on the support portion; and first and second magnets supported by the housing relative to the top surface such that dipoles containing magnetic information of a document passed along the top surface are aligned;

the magnetic read head and the first and second magnets being positioned along a line parallel to the direction of travel, and the housing being configured such that the second planar surface is exposed to permit a human hand to press the first planar surface of a document onto the second planar surface and urge the document against the document guide rail, and to manually slide the document along the second planar surface, the document guide rail and the line from the first and second magnets over the magnetic read head.

2. The device of claim 1, where the first magnet includes a first pole of a first polarity and a second pole of a second polarity, the second magnet includes a third pole of the first polarity and a fourth pole of the second polarity, and the first and second magnets are supported on opposite sides of the second planar surface such that the first, second, third and fourth poles are located generally along an axis which is perpendicular to the second planar surface and one of the pairs of the first and third poles, and the second and fourth poles are located adjacent to the first planar surface when the document is slid along the second planar surface.

3. The device of claim 1, wherein the first and second magnets are DC electromagnets.

4. The device of claim 1, wherein the first and second magnets are permanent magnets.

5. The device of claim 1, further comprising a document drive wheel including a centrally disposed rotational axis and a perimeter surface, and a rotating mechanism configured to impart rotational motion to the document drive wheel, wherein the document drive wheel is mounted on the rotating mechanism and the rotating mechanism is supported by the housing such that the perimeter surface of the document drive wheel engages the top surface of the magnetic read head; and wherein the top surface of the magnetic read head contacts the first planar surface of the document when the document slides along the second planar surface of the housing.

6. The device of claim 5, wherein the rotating mechanism comprises:

a shaft upon which the document drive wheel is mounted;

a first gear mounted to the shaft;

a bearing surface disposed about the shaft to rotatably support the shaft about a rotational axis of the shaft, the bearing being mounted to the housing;

an electric motor including a motor shaft; and a second gear mounted to the motor shaft, the electric motor being mounted to the housing such that the first and second gears mesh.

7. A device for reading magnetically encoded information from documents which are hand-fed to the device, comprising:

a housing including a planar surface having a document guide rail, the document guide rail extending upwardly from the planar surface and along a direction of travel for a document parallel to the planar surface;

a magnetic read head including a top surface, the magnetic read head being mechanically supported relative to the housing in a position suitable to permit the magnetic read head to read information from the document;

first and second magnets supported by the housing relative to the planar surface such that dipoles of magnetic information of a document passed along the planar surface are aligned;

a circuit board fabricated from a material, and including a support portion and a support member, the support portion and the support member being fabricated from the material such that the support portion is suspended relative to the circuit board to permit resilient deflection of the support portion relative to the circuit board; and an electric circuit coupled to the magnetic read head and supported upon the circuit board, the magnetic read head being mechanically mounted on the support portion and the circuit board being mechanically supported by the housing;

the magnetic read head and the first and second magnets being positioned along a line parallel to the direction of travel, and the housing being configured such that the planar surface is exposed to permit a human hand to force a document onto the planar surface and against the document guide rail, and to move the document along the planar surface, the document guide rail and the line from the first and second magnets toward the magnetic read head.

8. The device of claim 7, where the electric circuit is an amplifying circuit.

9. The device of claim 8, further comprising a digital computer mounted on the circuit board and connected to the electric circuit.

10. A device for reading magnetically encoded information from checks which are hand-fed to the device, comprising:

a housing including a planar surface having a straight check guide rail and an opening extending through the planar surface, the straight check guide rail extending upward from the planar surface and along a direction of travel parallel to the planar surface, wherein the planar surface is configured to slidably support a check;

a magnetic read head including a top surface, the magnetic read head being mechanically supported relative to the housing to extend through the opening with the top surface substantially in a same plane as the planar surface such that the top surface contacts a check in contact with the planar surface;

a circuit board mechanically supported by the housing and being fabricated from a material, the circuit board including a support portion and a support member, the support portion and the support member being fabricated from the material such that the support portion is suspended relative to the circuit board to permit resilient deflection of the support portion relative to the circuit board, wherein the magnetic read head is mechanically supported on the support portion; and a first magnet having a first pole of a first polarity and a second pole of a second polarity; and a second magnet having a third pole of the first polarity and a fourth pole of the second polarity, the first and second magnets being supported by the housing on opposite sides of the planar surface such that the first, second, third and fourth poles are located generally along an axis which is perpendicular to the plane of the planar surface and one of the pairs of the first and third poles, and the second and fourth poles are located adjacent to the planar surface;

the magnetic read head and the first and second magnets being positioned along a line parallel to the direction of travel, and the housing being configured such that the planar surface is exposed to permit a human hand to press a check onto the planar surface and against the straight check guide rail, and to slide the check along the planar surface and the straight check guide rail along the line in a direction from the first and second magnets to the magnetic read head.

11. The device of claim 10, further comprising a document drive wheel including a centrally disposed rotational axis and a perimeter surface, and a rotating mechanism configured to impart rotational motion to the document drive wheel, the document drive wheel being mounted on the rotating mechanism and the rotating mechanism being supported by the housing such that the perimeter surface of the document drive wheel engages the top surface of the magnetic read head.

12. The device of claim 11, wherein the rotating mechanism comprises:

a shaft upon which the document drive wheel is mounted;

a first gear mounted to the shaft;

a bearing surface disposed about the shaft to rotatably support the shaft about a rotational axis of the shaft, the bearing being mounted to the housing;

an electric motor including a motor shaft; and a second gear mounted to the motor shaft, wherein the electric motor is mounted to the housing such that the first and second gears mesh, and wherein the check along the planar surface has a planar face, the planar face in contact with and sliding along the planar surface.

13. A device for reading magnetically encoded information from checks which are hand-fed to the device, comprising:

a housing including a planar surface having a straight check guide rail and an opening extending through the planar surface, the straight check guide rail extending upwardly from the planar surface and along a direction of travel parallel to the planar surface;

a magnetic read head including a top surface, the magnetic read head being mechanically supported relative to the housing to extend through the opening with the top surface substantially in a same plane as the planar surface such that the top surface contacts a check in contact with the planar surface;

a first magnet having a first pole of a first polarity and a second pole of a second polarity;

a second magnet having a third pole of the first polarity and a fourth pole of the second polarity, the first and second magnets being supported by the housing on opposite sides of the planar surface such that the first, second, third and fourth poles are located generally along an axis which is perpendicular to the planar surface and one of the pairs of the first and third poles, and the second and fourth poles are located adjacent to the planar surface;

a circuit board fabricated from a material, and including a support portion and a support member, the support portion and the support member being fabricated from the material such that the support portion is suspended relative to the circuit board to permit elastic deflection of the support portion relative to the circuit board; and an electric circuit coupled to the magnetic read head and supported upon the circuit board, the magnetic read head being mechanically mounted on the support portion and the circuit board being mechanically supported by the housing;

the magnetic read head and the first and second magnets being positioned along a line parallel to the direction of travel, and the housing being configured such that the planar surface is exposed to permit a human hand to force a check onto the planar surface and against the straight check guide rail, and to move the check along the planar surface and the straight check guide rail along the line in a direction from the first and second magnets to the magnetic read head.

14. The device of claim 13, where the electric circuit is an amplifying circuit.

15. The device of claim 14, further comprising a digital computer mounted on the circuit board and connected to the electric circuit.

16. A hand-fed check reader for reading magnetically encoded information from a check, comprising:

a housing having a generally planar check support surface configured to slidably support a check and bounded on one side by a guide rail, and a first opening extending through the housing adjacent to the guide rail, wherein the support surface is configured to facilitate manual movement of a check along the support surface;

a read head configured to read magnetically encoded information from the check, wherein the read head is supported relative at the first opening, the read head having a read surface, the read surface being in a same plane as the support surface such that the read head contacts a check in contact with the support surface;

a circuit supported within the housing and electrically coupled to the read head to produce signals representative of the magnetically encoded information;

a circuit board fabricated from a material and including a support portion and a support member, the circuit being supported on the circuit board, the read head being mechanically mounted on the support portion, and the circuit board being mechanically supported by the housing, wherein the support portion is suspended relative to the support member to permit resilient deflection of the support portion relative to the support member;

a first magnet having a first pole of a first polarity and a second pole of a second polarity; and a second magnet having a third pole of the first polarity and a fourth pole of the second polarity, wherein the first and second magnets are supported by the housing such that the first, second, third and fourth poles are located generally along at least one axis which is perpendicular to the support surface with at least one pole from each of the first and second magnets being located adjacent to the support surface;

the read head and the first and second magnets being positioned along a line parallel to the direction of travel, and the housing being configured such that the support surface is exposed to permit a human hand to press a check onto the support surface and against the guide rail, and to slide the check along the support surface and the guide rail along the line in a direction from the first and second magnets and over the read head.

17. The check reader of claim 16, wherein the first and second magnets are located on opposite sides of the support surface, and one of the pairs of the first and third poles, and the second and fourth poles are located adjacent to the support surface.

18. The reader of claim 16, further comprising a digital computer coupled to the circuit, wherein the circuit applies the signals representative of the magnetically encoded information to the digital computer.

19. The reader of claim 16, further comprising a check drive wheel including a centrally disposed rotational axis and a perimeter surface, and a rotating mechanism configured to impart rotational motion to the check drive wheel, the check drive wheel being mounted on the rotating mechanism and the rotating mechanism being supported by the housing such that the perimeter surface of the check drive wheel engages the top surface of the read head.

20. The reader of claim 19, wherein the rotating mechanism comprises:

a shaft upon which the check drive wheel is mounted;

a first gear mounted to the shaft;

a bearing disposed about the shaft to rotatably support the shaft about a rotational axis of the shaft, the bearing being mounted to the housing;

an electric motor including a motor shaft; and a second gear mounted to the motor shaft; the electric motor being mounted to the housing such that the first and second gears mesh.

21. The reader of claim 16, wherein the first and second magnets are permanent magnets.

22. The reader of claim 16, wherein the first and second magnets are electromagnets.

23. A hand-fed check reader for reading magnetically encoded information from a check, comprising:

a housing having a generally planar check support surface bounded on one side by a guide rail, and a first opening extending through the housing adjacent to the guide rail, the support surface being configured to facilitate manual movement of a check along the support surface;

a read head configured to read magnetically encoded information from the check, the read head being supported relative at the opening;

a circuit supported within the housing and electrically coupled to the read head to produce signals representative of the magnetically encoded information;

a first magnet having a first pole of a first polarity and a second pole of a second polarity;

a second magnet having a third pole of the first polarity and a fourth pole of the second polarity, the first and second magnets being supported by the housing such that the first, second, third and fourth poles are located generally along at least one axis which is perpendicular to the support surface with at least one pole from each of said first and second magnets being located adjacent to the support surface; and a circuit board including a spring member fabricated from, and integral with, the circuit board, wherein the read head is mounted on the spring member, the circuit is fabricated on the circuit board and the circuit board is supported by the housing;

the read head and the first and second magnets being positioned along a line parallel to the direction of travel, and the housing being configured such that the support surface is exposed to permit a human hand to force a check onto the support surface and against the guide rail, and to move the check along the support surface and the guide rail along the line in a direction from the first and second magnets to the read head.

24. The reader of claim 23, further comprising an illuminating device and an optical sensor both electrically coupled to the circuit, wherein the support surface includes a port at which an edge of the check may be sensed, the illuminating device and optical sensor being mounted to the circuit board such that they are located at the port.

* * * * *